(12) United States Patent
Ono et al.

(10) Patent No.: US 7,264,277 B2
(45) Date of Patent: Sep. 4, 2007

(54) GASEOUS FUEL VEHICLE REAR STRUCTURE

(75) Inventors: Tohru Ono, Wako (JP); Akira Nakashima, Wako (JP); Yusuke Sogawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 127 days.

(21) Appl. No.: 11/041,796

(22) Filed: Jan. 21, 2005

(65) Prior Publication Data
US 2005/0161935 A1  Jul. 28, 2005

(30) Foreign Application Priority Data

| Jan. 22, 2004 | (JP) | ............................... 2004-014931 |
| Jan. 22, 2004 | (JP) | ............................... 2004-014962 |
| Jan. 29, 2004 | (JP) | ............................... 2004-022214 |

(51) Int. Cl.
*B60P 3/22* (2006.01)
(52) U.S. Cl. ...................... 280/830; 280/834; 280/781; 280/790; 280/783
(58) Field of Classification Search ................ 280/830, 280/834, 781, 790, 783
See application file for complete search history.

(56) References Cited

U.S. PATENT DOCUMENTS

| 5,794,979 | A | * | 8/1998 | Kasuga et al. ............... 280/834 |
| 5,810,309 | A | * | 9/1998 | Augustine et al. ........... 248/313 |
| 5,997,040 | A | * | 12/1999 | Fukagawa et al. ........... 280/834 |
| 6,042,071 | A | * | 3/2000 | Watanabe et al. ............ 248/313 |
| 6,099,042 | A | * | 8/2000 | Cook et al. .................. 280/834 |
| 6,257,360 | B1 | * | 7/2001 | Wozniak et al. ............. 180/69.5 |
| 6,672,620 | B2 | * | 1/2004 | Kawazu et al. .............. 280/834 |
| 6,676,163 | B2 | * | 1/2004 | Joitescu et al. .............. 280/834 |
| 6,736,229 | B1 | * | 5/2004 | Amori et al. ................ 180/68.5 |
| 7,063,355 | B2 | * | 6/2006 | Hashimura .................. 280/830 |

FOREIGN PATENT DOCUMENTS

| JP | 4-5184 | 1/1992 |
| JP | 9-300987 | 11/1997 |
| JP | 2000-219050 | 8/2000 |
| JP | 2003-063457 | 3/2003 |
| JP | 2003-63457 | 3/2003 |

OTHER PUBLICATIONS

Japanese Office Action for Application No. 2004-014962.

* cited by examiner

*Primary Examiner*—Lesley D. Morris
*Assistant Examiner*—Marlon Arce-Diaz
(74) *Attorney, Agent, or Firm*—Lahive & Cockfield, LLP; Anthony A. Laurentano, Esq.

(57) ABSTRACT

A rear structure of a gaseous fuel vehicle in this invention includes right and left rear frame members, and a support frame mounted to the right and left rear frame members, on which support frame a gaseous fuel tank is mounted. Each of the right and left rear frame members is constituted by a curved member which includes a curved portion curving upward, and a front linear portion and a rear linear portion which are lower than the highest portion of the curved portion. The support frame is attached to the front linear portions and the rear linear portions. The front linear portions are attached to the rear end of a vehicle frame to provide a low floor in a passenger compartment. A load applied to the rear ends of the right and left rear frame members is dispersed into the right and left rear frame members and the support frame, and transmitted to the vehicle frame.

6 Claims, 23 Drawing Sheets

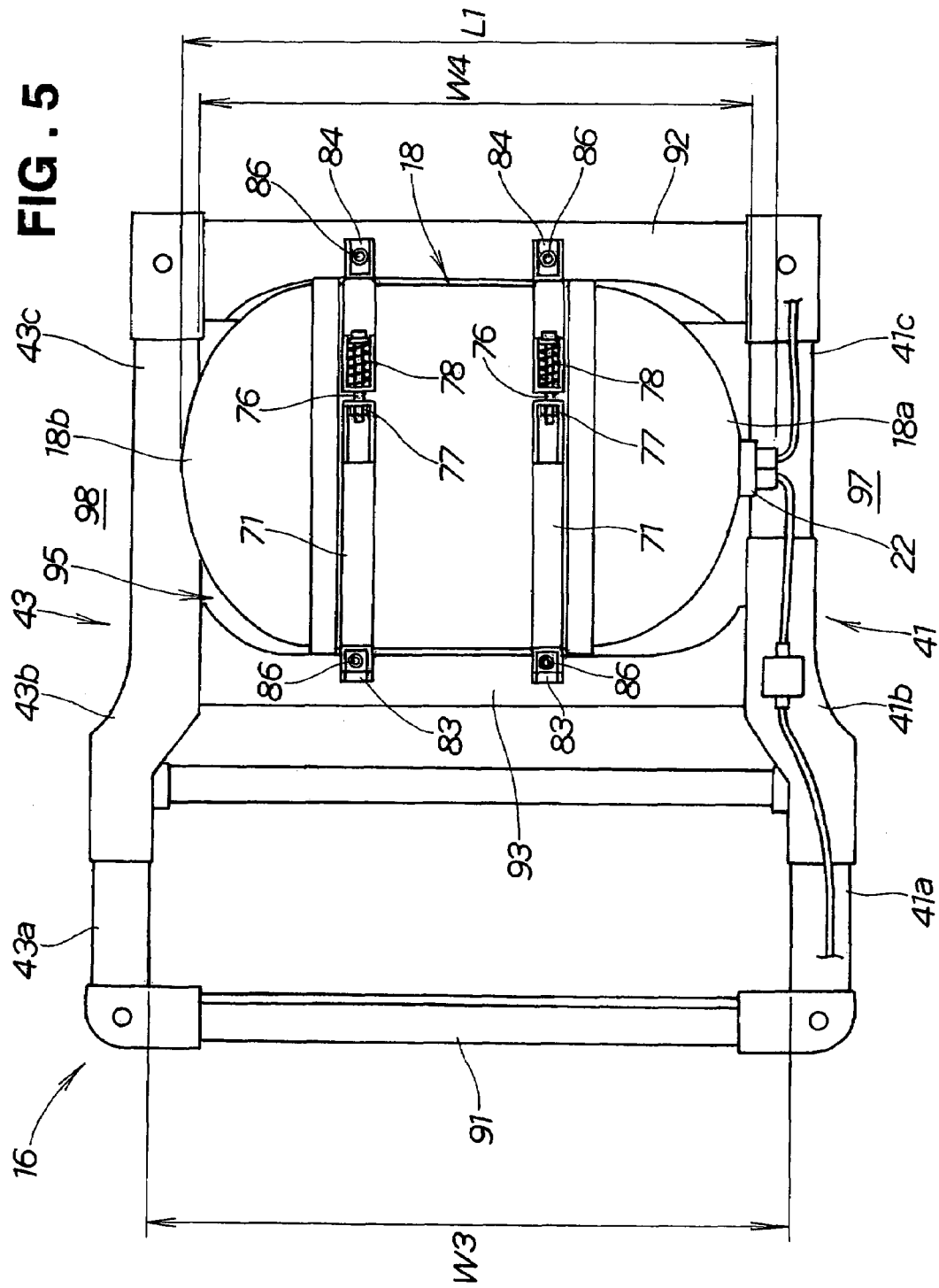

( EXA .)

GASEOUS FUEL VEHICLE REAR STRUCTURE

FIELD OF THE INVENTION

The present invention relates to a rear structure of a gaseous fuel vehicle, and more particularly, to a rear structure of a gaseous fuel vehicle in which a gaseous fuel tank is mounted on a support frame, and the support frame is mounted to right and left rear frame members.

BACKGROUND OF THE INVENTION

Gaseous fuel vehicles have widely been developed in recent years to reduce impacts on the environment. The gaseous fuel vehicle is provided with a gaseous fuel tank in the rear of the vehicle. Various frame structures for holding a gaseous fuel tank have been developed. In Japanese Patent Laid-Open Publication No. 2000-219050, for example, a vehicle frame structure is proposed which is configured to hold two gaseous fuel tanks which are oriented transversely and arranged one behind the other in parallel below vehicle rear cushions.

In Japanese Patent Laid-Open Publication No. 2003-63457, a vehicle frame structure is proposed in which a gaseous fuel tank is mounted on a support frame, and the support frame is mounted to right and left rear frame members, whereby the gaseous fuel tank is mounted to the rear of a vehicle.

The rear structure of the gaseous fuel vehicle disclosed in the 2003-63457 publication will be described below with reference to FIG. 24 hereof.

A vehicle rear structure 800 shown in FIG. 24 includes a support frame 801 on which front and rear two gaseous fuel tanks 802, 803 are mounted transversely. The support frame 801 is mounted to left and right rear frame members 804, 805. The front and rear gaseous fuel tanks 802, 803 are accommodated in a space 810 between the left and right rear frame members 804, 805 and the support frame 801. Thus, the front and rear gaseous fuel tanks 802, 803 are protected by the left and right rear frame members 804, 805 and the support frame 801.

Front ends 804a, 805a of the left and right rear frame members 804, 805 are offset above left and right side sills 806, 807 in order to secure the space 810. Therefore, it is necessary to connect the front ends 804a, 805a of the left and right rear frame members 804, 805 to the rear ends of the left and right side sills 806, 807 by a connector 808.

The connector 808 includes a left extension 811 extending rearward from the rear end of the left side sill 806. A left bracket 813 is attached to the left extension 811. The connector 808 also includes a right extension 812 extending rearward from the rear end of the right side sill 807. A right bracket 814 is attached to the right extension 812.

It is necessary to provide the connector 808 with strength so that when a load is applied to a bumper beam 809 provided at the rear ends of the left and right rear frame members 804, 805 as shown by an arrow, the applied load can be transmitted to the left and right side sills 806, 807.

In order to ensure the strength of the connector 808, it is required to increase the rigidity of the left and right extensions 811, 812 as well as reinforcing the left and right extensions 811, 812 by the left and right brackets 813, 814. This causes a complicated configuration of the rear structure 800 of the gaseous fuel vehicle, and can prevent a weight reduction of the rear structure 800 of the gaseous fuel vehicle.

Also, since the left and right rear frame members 804, 805 are arranged above the front and rear gaseous fuel tanks 802, 803, it is necessary to offset the front ends 804a, 805a of the left and right rear frame members 804, 805 above the left and right side sills 806, 807. This arrangement makes it difficult to reduce the height of the front ends 804a, 805a of the left and right rear frame members 804, 805, preventing a low floor in a passenger compartment.

For these reasons, there is a desire for an art which allows for simplify-cation and weight reduction of a rear structure, and also allows for a low floor in a passenger compartment.

A support structure for the front and rear gaseous fuel tanks 802, 803 shown in FIG. 24 will be described with reference to FIG. 25.

Referring to FIG. 25, a gaseous fuel tank support structure 820 includes the support frame 801 for holding the front and rear gaseous fuel tanks 802, 803.

A pair of front holding bands 822, 822 are fastened around the front gaseous fuel tank 802 and attached to the support frame 801 by a plurality of bolts 826 via front mounting brackets 823, 823 and rear mounting brackets 824, 824 for the front holding bands 822, 822. That is, the front gaseous fuel tank 802 is fixed to the support frame 801 with the front holding bands 822, 822.

As in the front gaseous fuel tank 802, a pair of rear holding bands 832, 832 are fastened around the rear gaseous fuel tank 803 and attached to the support frame 801 by a plurality of bolts 826 via front mounting brackets 833, 833 and rear mounting brackets 834, 834 for the rear holding bands 832, 832. That is, the rear gaseous fuel tank 803 is fixed to the support frame 801 with the rear holding bands 832, 832.

The center of gravity of the rear gaseous fuel tank 803 is located at the center height G2. The difference in height between the center of gravity G2 and the support frame 801 is L.

When the vehicle is running on a bad road, longitudinally moving forces act on the rear gaseous fuel tank 803, and horizontal forces act on the center of gravity G2 of the rear gaseous fuel tank 803. As a result, moments (overturning moments) of (horizontal force)×(height difference L) act on the front mounting brackets 833 and the rear mounting brackets 834.

To withstand the moments, it is necessary to increase the strength of the front and rear mounting brackets 833, 834 and the bolts 826. According to the increased strength of those components, it is necessary to increase the thickness of the rear holding bands 832, 832 to increase the strength.

The same is true for the front gaseous fuel tank 802, and is not described redundantly.

For these reasons, there is a desire for an art of supporting a gaseous fuel tank which allows for reduction in strength of mounting brackets and holding bands.

SUMMARY OF THE INVENTION

According to the present invention, there is provided a rear structure of a gaseous fuel vehicle, which comprises: right and left rear frame members extending longitudinally of the vehicle; and a rectangular support frame mounted to the right and left rear frame members, the support frame being configured to allow at least one substantially cylindrical gaseous fuel tank to be mounted thereon in a transversely extending position; wherein, each of the right and left rear frame members includes a curved portion bulging out upward, a front linear portion extending forward from a front end of the curved portion, and a rear linear portion extending rearward from a rear end of the curved portion; and the support frame is attached to the front linear portions and the rear linear portions.

The rear frame members according to the present invention are curved as described above.

When rear frame members are formed linearly, for example, it is necessary to offset the rear frame members upward with respect to a vehicle frame in front. Connections between the vehicle frame and the rear frame members constitute right-angled portions. It is necessary to provide sufficient strength to the right-angled portions. That is, in order to smoothly transmit an external force applied to the rear ends of the rear frame members to the front, it is necessary to increase the strength of the right-angled portions to prevent their deformation. In this regard, in the present invention, the rear frame members are comprised of the front linear portions, the curved portions and the rear linear portions, eliminating right-angled portions.

The rear frame members are configured such that the front linear portions and the rear linear portions are in a substantially straight line. The support frame supporting the gaseous fuel tank is attached to the front linear portions and the rear linear portions. Consequently, the front linear portions, the rear linear portions and the support frame form a substantially straight line. When a load is applied to rear portions of the rear frame members, the load is efficiently dispersed into the rear frame members and the support frame, so that a load applied to the rear frame members can be reduced.

As described above, the present invention can eliminate right-angled portions and reduce a load applied to the rear frame members, thus simplifying and reducing the weight of the vehicle rear structure.

The rear frame members are curved members comprised of the front linear portions, the curved portions and the rear linear portions, so that inclined portions of the rear frame members, that is, portions near the front linear portions and portions near the rear linear portions are lowered. Consequently, a floor surface located on the front linear portions and the rear linear portions can be lowered to provide a low floor in a passenger compartment.

The vehicle rear structure in the present invention preferably further comprises a connecting member rising from the support frame and connected to a portion near a highest portion of the curved portion. When a load is applied to rear portions of rear frame members including curved portions, the curved portions can be deformed. The curved portions are fixed on and supported by the connecting members, and thus prevented from deforming upward. Therefore, a load applied to the rear portions of the rear frame members is efficiently transmitted to the vehicle frame in front of the rear frame members through the rear frame members. By preventing deformation of the curved portions, areas enclosed by the connecting members, curved portions including the highest portions, and the support frame can be maintained.

Preferably, the gaseous fuel tank disposed in the rear structure of the present invention can be fixed to the support frame by a holding band. The use of the holding band facilitates the fixing of the gaseous fuel tank to the support frame.

It is desirable that the rear structure further comprises a support member rising from the support frame and having a height almost reaching a center height of the gaseous fuel tank, and the holding band is fixed at a front portion and/or a rear portion thereof to the support member. The gaseous fuel tank is a generally cylindrical tank, and the center of gravity of the gaseous fuel tank is located at the center height of the gaseous fuel tank when the gaseous fuel tank is disposed in the transversely extending position.

Specifically, front and rear mounting brackets are attached to a front portion and a rear portion of the holding band, and the front mounting bracket and/or the rear mounting bracket are attached to the support member.

Consequently, the center of gravity of the gaseous fuel tank is supported by the support member. When a vehicle is running on a bad road, for example, and longitudinal forces act on the center of gravity of the gaseous fuel tank, no substantial moments occur at the front mounting bracket and/or the rear mounting bracket, and the holding band. Such moments are caused by a difference in height between the center of gravity (height center) of the gaseous fuel tank and the fixed position of the gaseous fuel tank. Therefore, the front mounting bracket and/or the rear mounting bracket and the holding band can be reduced in strength, and the holding band can be reduced in thickness. The reduction in strength of the front mounting bracket and/or the rear mounting bracket and the holding band leads to reduced weights of these components.

When the gaseous fuel tank tries to move toward the support member, the support member can prevent the movement of the gaseous fuel tank without resort to the front and rear mounting brackets and the holding band. Thus, the front mounting bracket and/or the rear mounting bracket and the holding band can be reduced further in strength.

In the present invention, when two gaseous fuel tanks are provided in parallel one behind the other, the support member is preferably provided between the front and rear gaseous fuel tanks. The support member can be used as a member for mounting both the front and rear gaseous fuel tanks, enabling effective use of space.

In the present invention, a tank valve attached to the gaseous fuel tank is preferably disposed in an area enclosed by the curved portion and the support frame.

When a load is applied to the rear portions of the rear frame members which are curved members with the curved portions bulging upward, the curved portions generally tend to deform upward, or outward. Thus, when deformed by a load applied to the rear portions of the rear frame members, the curved portions deform in a direction away from the tank valve, and the rear frame members are prevented from interfering with the tank valve.

BRIEF DESCRIPTION OF THE DRAWINGS

Preferred embodiments of the present invention will be described in detail below, by way of example only, with reference to the accompanying drawings, in which:

FIG. 5 is a plan view of a support frame on which a gaseous fuel tank is mounted, a view taken in the direction of arrow 5 in FIG. 3;

DETAILED DESCRIPTION OF THE PREFERRED EMBODIMENTS

FIGS. 1 to 5 illustrate a rear structure of a gaseous fuel vehicle according to a first embodiment of the present invention.

Figure 1:
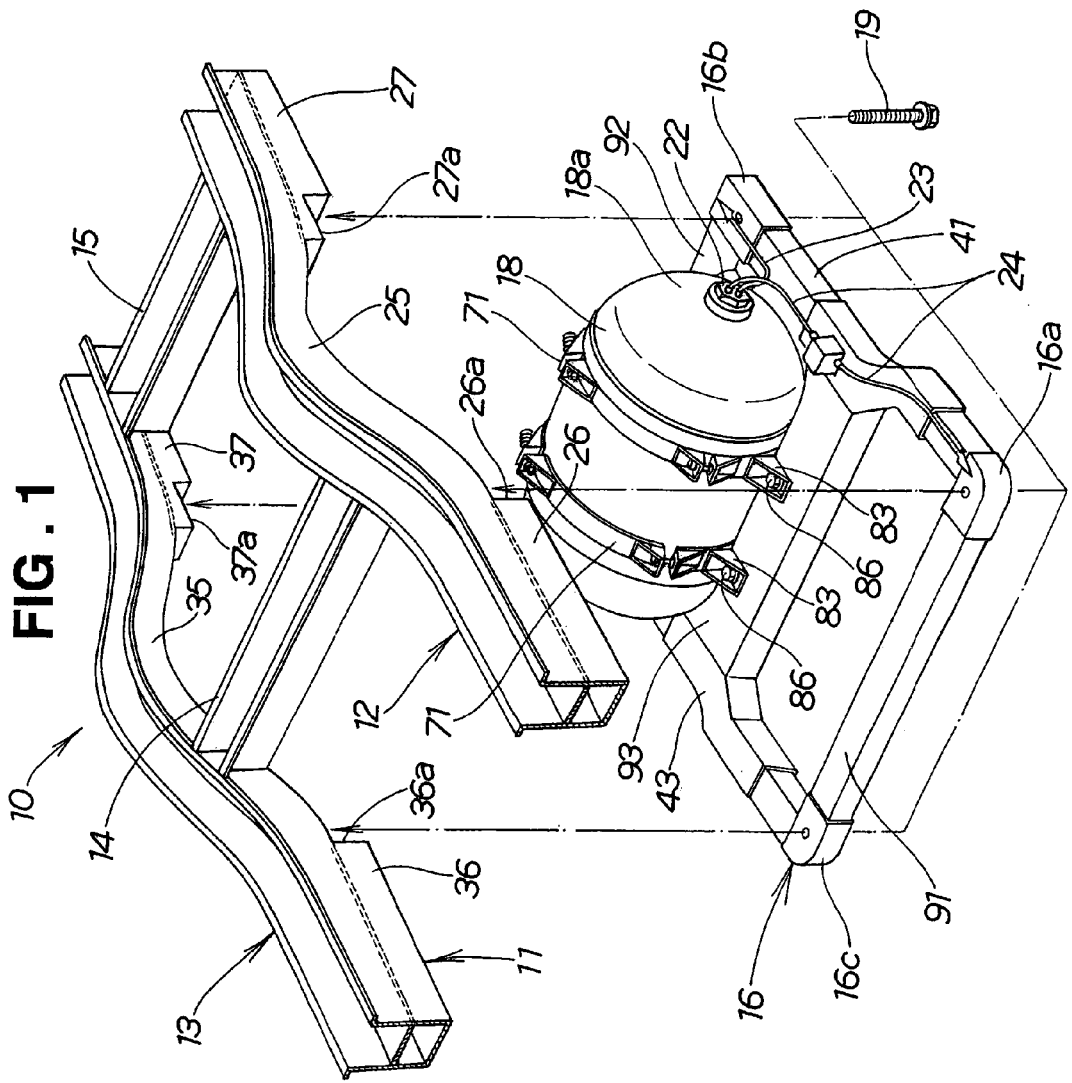
FIG. 1 is an exploded perspective view of a rear structure of a gaseous fuel vehicle according to a first embodiment of the present invention.
Figure 2:
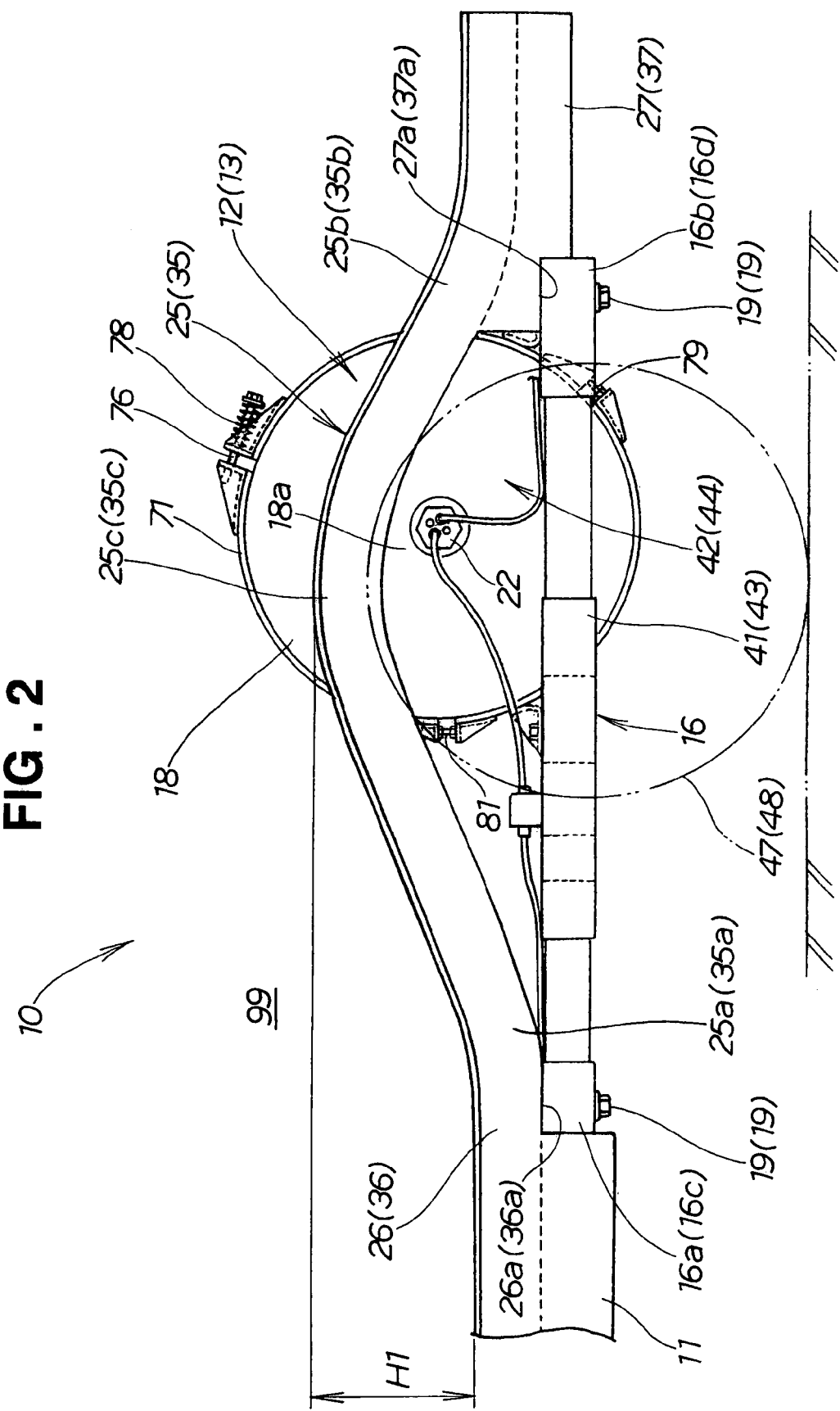
FIG. 2 is a side view of the rear structure of the gaseous fuel vehicle shown in FIG. 1.

Referring to FIGS. 1 and 2, a rear structure 10 of a gaseous fuel vehicle in the first embodiment includes left and right rear frame members 12, 13 extending to the rear of the vehicle from left and right rear end portions of a vehicle frame 11 which is comprised of left and right side sills and so on, and a rectangular support frame 16.

The left and right rear frame members 12, 13 are connected by a center crossmember 14 at their generally middle portions, and connected by a rear crossmember 15 at their rear end portions.

A gaseous fuel tank 18 is mounted on the support frame 16 in a transversely extending manner. To mount the support frame 16 to the underside of the left and right rear frame members 12, 13, the four corners of the support frame 16 are attached thereto by bolts 19.

Although this embodiment will be described with an example in which the vehicle frame 11 comprised of the left and right side sills and so on is integrally formed with the left and right rear frame members 12, 13, the vehicle frame 11 and the left and right rear frame members 12, 13 may alternatively be formed by separate members, or the left and right rear frame members 12, 13 may be connected to the vehicle frame 11.

The gaseous fuel tank 18 is in a cylindrical shape. The gaseous fuel tank 18 has a tank valve 22 at the center of a left end 18a, for example. A gas supply line 23 and a gas introduction line 24 are connected to the tank valve 22. The gas supply line 23 is a pipe for supplying gas to the gaseous fuel tank 18. The gas introduction line 24 is a pipe for introducing gas in the gaseous fuel tank 18 to a desired component.

As shown in FIG. 2, the left rear frame member (rear frame member) 12 is a longitudinally extending curved member which includes a left curved portion (curved portion) 25 bulging out upward at its longitudinally generally middle portion. The left curved portion 25 includes a front linear portion 26 extending forward from its front end 25a and a rear linear portion 27 extending rearward from its rear end 25b.

More specifically, the left rear frame member 12 has a front depressed portion 26a formed in a rear lower portion of the front linear portion 26, and a rear depressed portion 27a formed in a front lower portion of the rear linear portion 27. A left front end 16a of the support frame 16 is fitted into the front depressed portion 26a, and a left rear end 16b of the support frame 16 is fitted into the rear depressed portion 27a. With this, the support frame 16 is mounted to the bottom of the front linear portion 26 and the bottom of the rear linear portion 27 of the left rear frame member 12.

Likewise, the right rear frame member (rear frame member) 13 (see also FIG. 1) is a longitudinally extending curved member which includes a right curved portion (curved portion) 35 bulging out upward at its longitudinally generally middle portion. The right curved portion 35 includes a front linear portion 36 extending forward from its front end 35a and a rear linear portion 37 extending rearward from its rear end 35b.

More specifically, the right rear frame member 13 (see FIG. 1) has a front depressed portion 36a formed in a rear lower portion of the front linear portion 36, and a rear depressed portion 37a formed in a front lower portion of the rear linear portion 37. A right front end 16c of the support frame 16 (see FIG. 1) is fitted into the front depressed portion 36a, and a right rear end 16d of the support frame 16 is fitted into the rear depressed portion 37a. With this, the support frame 16 is mounted to the bottom of the front linear portion 36 and the bottom of the rear linear portion 37 of the right rear frame member 13.

With the left front and rear ends 16a, 16b of the support frame 16 fitted into the front and rear depressed portions 26a, 27a of the left rear frame member 12, and with the right front and rear ends 16c, 16d of the support frame 16 fitted into the front and rear depressed portions 36a, 37a of the right rear frame member 13 as described above, the support frame 16 is horizontally mounted to the front linear portion 26 and the rear linear portion 27 of the left rear frame member 12 and the front linear portion 36 and the rear linear portion 37 of the right rear frame member 13.

Consequently, a left area 42 is formed by the left curved portion 25 of the left rear frame member 12 and a left side member 41 of the support frame 16. Likewise, a right area 44 is formed by the right curved portion 35 of the right rear frame member and a right side member 43 of the support frame 16 (see FIG. 1).

Left and right ends 18a, 18b of the gaseous fuel tank 18 (see FIGS. 4 and 5 for the right end 18b) are arranged in the left area 42 and the right area 44, respectively. The gaseous fuel tank 18 is thus protected by the left and right rear frame members 12, 13 and the support frame 16. At the same time, the tank valve 22 provided at the left end 18a of the gaseous fuel tank 18 is protected by the left rear frame member 12 and the support frame 16.

Figure 4:
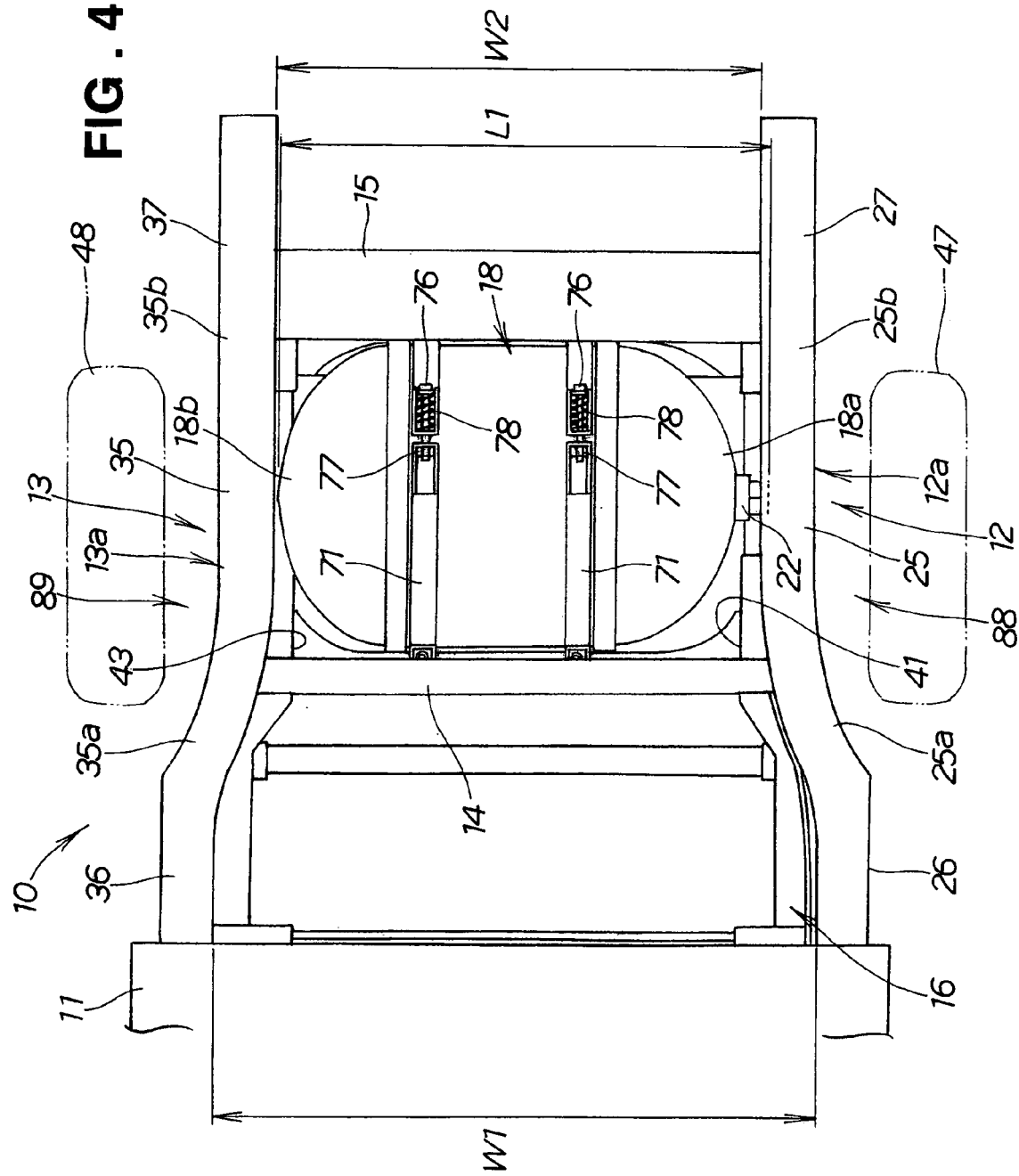
FIG. 4 is a plan view of the rear structure of the gaseous fuel vehicle shown in FIG. 2.

As shown in FIG. 4, a left rear wheel 47 is disposed outside the left curved portion 25 of the left rear frame member 12 and the left side member 41 of the support frame 16.

A right rear wheel 48 is disposed outside the right curved portion 35 of the right rear frame member 13 and the right side member 43 of the support frame 16, as shown in FIG. 4.

The front linear portions 26, 36 of the left and right rear frame members 12, 13 are lower than highest portions 25c, 35c of the left and right curved portions 25, 35 by H1 to be located at the height of the vehicle frame 11. The rear linear portions 27, 37 are also lowered to predetermined locations.

The left and right front linear portions 26, 36 are lowered to the height of the vehicle frame 11 as described above, so as to substantially collinearly join front end portions of the left and right rear frame members 12, 13 (that is, the front linear portions 26, 36) to the vehicle frame 11. With this, connections (not shown) between the front end portions of the left and right rear frame members 12, 13 (that is, the front linear portions 26, 36) and the vehicle frame 11 can be configured simply or eliminated, for the simplification and weight reduction of the vehicle rear structure 10. Further, a floor surface (not shown) located on the front linear portions 26, 36 and nearby portions (that is, front inclined portions of the left and right curved portions 25, 35), and the rear linear portions 27, 37 and nearby portions (that is, rear inclined portions of the left and right curved portions 25, 35) becomes lower, resulting in a low floor in a passenger compartment 99.

As shown in FIG. 1, a pair of holding band units 71, 71 are fastened around the gaseous fuel tank 18 with a predetermined space therebetween.

Figure 3:
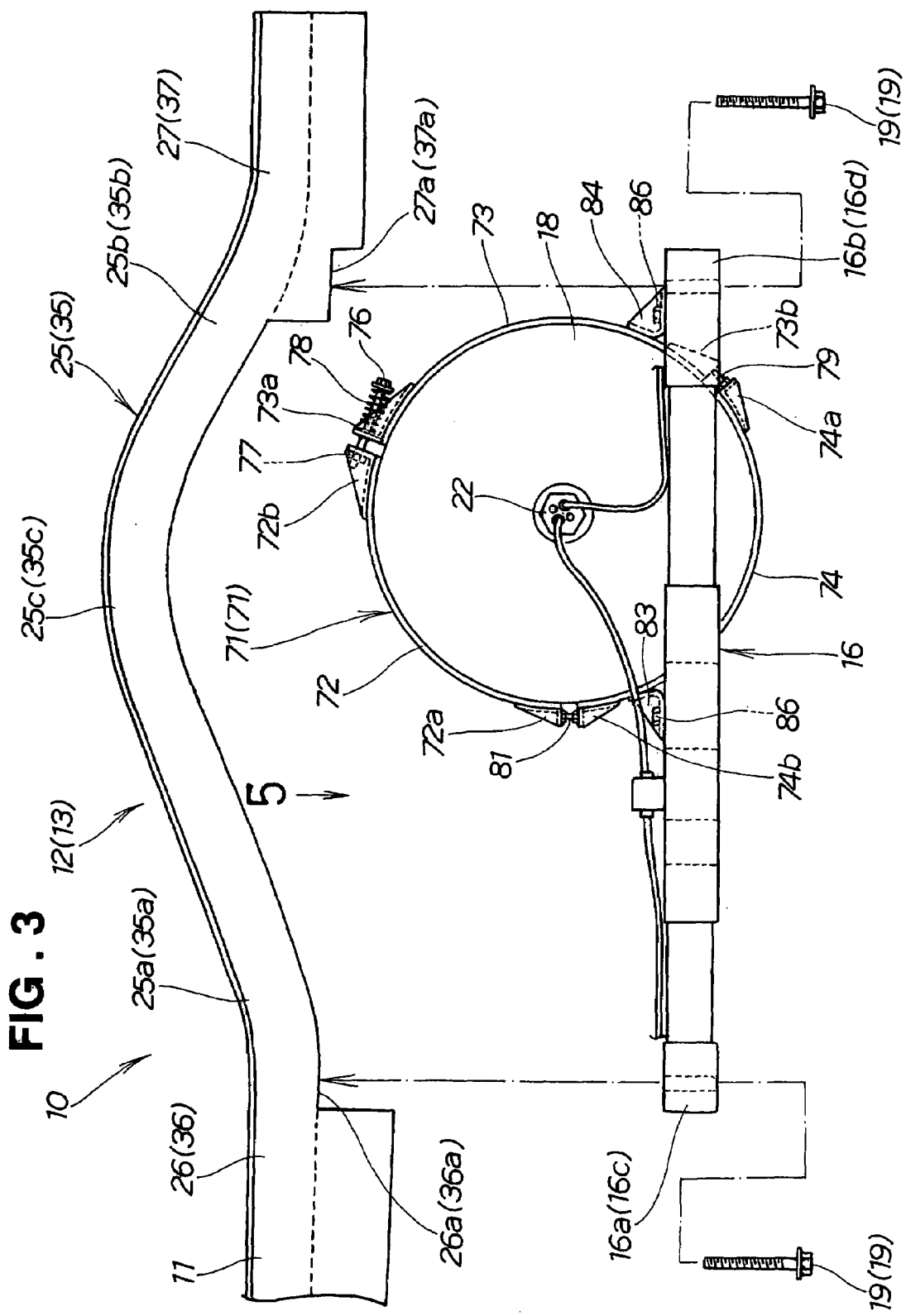
FIG. 3 is an exploded side view of the rear structure of the gaseous fuel vehicle shown in FIG. 2.

As shown in FIG. 3, the holding band units 71 each include a first band 72, a second band 73, and a third band 74.

A rear end 72b of the first band 72 is connected to a front end 73a of the second band 73 by a bolt 76 and a nut 77. A compression spring 78 is interposed between the bolt 76 and the front end 73a. A rear end 73b of the second band 73 is connected to a front end 74a of the third band 74 by a bolt 79 and a nut (not shown). A rear end 74b of the third band 74 is connected to a front end 72a of the first band 72 by a bolt 81 and a nut (not shown).

Thus, the first band 72, the second band 73, and the third band 74 are connected by the bolts 76, 79, 81 to constitute the holding band unit 71. The holding band unit 71 is fastened around the gaseous fuel tank 18. The holding band unit 71 is provided with front and rear mounting brackets 83, 84 (see also FIG. 5).

The holding band unit 71 can be finely adjusted relatively easily in the mounting positions of the front and rear mounting brackets 83, 84 by connecting the first band, second band 73 and third band 74 by the bolts 76, 79, 81.

The rear end 72b of the first band 72 is connected to the front end 73a of the second band 73 by the bolt 76, and the compression spring 78 is disposed between the bolt 76 and the rear end 72a, so that the holding band unit 71 appropriately maintains its fastening force on the gaseous fuel tank 18.

The front and rear brackets 83, 84 are attached to the support frame 16 by bolts 86, 86 (see FIG. 5), so that the gaseous fuel tank 18 is mounted to the support frame 16.

The gaseous fuel tank 18 is provided with a large diameter, so that the tank valve 22 of the gaseous fuel tank 18 is located above the support frame 16.

As shown in FIG. 4, the left and right rear frame members 12, 13 are extended rearward from the left and right ends of the vehicle frame 11. The rear frame members 12, 13 are connected at their generally middle portions by the center crossmember 14, and also connected at their rear end portions by the rear crossmember 15.

In a plan view, the left rear frame member 12 has the front linear portion 26 extended straight rearward, the front end 25a of the left curved portion 25 extended obliquely inward from the front linear portion 26, and a left linear portion 12a which is a portion extended straight rearward from the front end 25a through the middle and the rear end 25b of the left curved portion 25 to the rear linear portion 27.

The right rear frame member 13 is a member formed symmetrically to the left rear frame member 12, and in a plan view, has the front linear portion 36 extended straight rearward, the front end 35a of the right curved portion 35 extended obliquely inward from the front linear portion 36, and a right linear portion 13a which is a portion extended straight rearward from the front end 35a through the middle and the rear end 35b of the right curved portion 35 to the rear linear portion 37.

The distance between the front linear portion 26 of the left rear frame member 12 and the front linear portion 36 of the right rear frame member 13 is W1.

The distance between the left linear portion 12a of the left rear frame member 12 and the right linear portion 13a of the right rear frame member 13 is W2.

The distance W1 is set larger than the distance W2 so as to secure a left space 88 for the left rear wheel 47 provided outside the left linear portion 12a of the left rear frame member 12, and to secure a right space 89 for the right rear wheel 48 provided outside the right linear portion 13a of the right rear frame member 13.

To secure the left and right spaces 88, 89 in which the left and right rear wheels 47, 48 are located, it is required to reduce the distance between the left and right linear portions 12a, 13a to W2.

Therefore, it is difficult to set the distance W2 larger than the length L1 of the gaseous fuel tank 18, and it is required to prevent the tank valve 22 of the gaseous fuel tank 18 from interfering with the left rear frame member 12.

For this, the gaseous fuel tank 18 is disposed in the left area 42 shown in FIG. 2, to prevent the tank valve 22 of the gaseous fuel tank 18 from interfering with the left rear frame member 12.

As shown in FIG. 5, the support frame 16 has the left and right side members 41, 43 extended longitudinally of the vehicle with a predetermined space therebetween, the front ends of the left and right side members 41, 43 connected by a front crossmember 91, the rear ends of the left and right side members 41, 43 connected by a rear crossmember 92, and middle portions of the left and right side members 41, 43 connected by a center crossmember 93.

The left and right side members 41, 43, the center crossmember 93 and the rear crossmember 92 form a holding area 95 in which the fuel tank 18 is held.

In a plan view, the left side member 41 has a front end portion 41*a* extended straight rearward, an inclined portion 41*b* extended obliquely inward from the front end portion 41*a*, and a linear portion 41*c* extended straight rearward from the inclined portion 41*b*.

The right side member 43 is a member formed symmetrically to the left side member 41, and in a plan view, has a front end portion 43*a* extended straight rearward, an inclined portion 43*b* extended obliquely inward from the front end portion 43*a*, and a linear portion 43*c* extended straight rearward from the inclined portion 43*b*.

In this arrangement, W3>W4, where W3 is the distance between the front end portions 41*a*, 43*a* of the left and right side members 41, 43, and W4 is the distance between the linear portions 41*c*, 43*c* of the left and right side members 41, 43.

This relationship of W3>W4 secures a left space 97 in which the left rear wheel 47 (see FIG. 4) is located outside the linear portion 41*c* of the left side member 41, and secures a right space 98 in which the right rear wheel 48 (see FIG. 4) is located outside the linear portion 43*c* of the right side member 43.

To secure the left and right spaces 97, 98, it is required to reduce the distance between the left and right linear portions 41*c*, 43*c* to W4.

Therefore, it is difficult to set the distance W4 larger than the length L1 of the gaseous fuel tank 18, and it is required to prevent the tank valve 22 of the gaseous fuel tank 18 from interfering with the linear portion 41*c* of the left side member 41.

Figure 10:
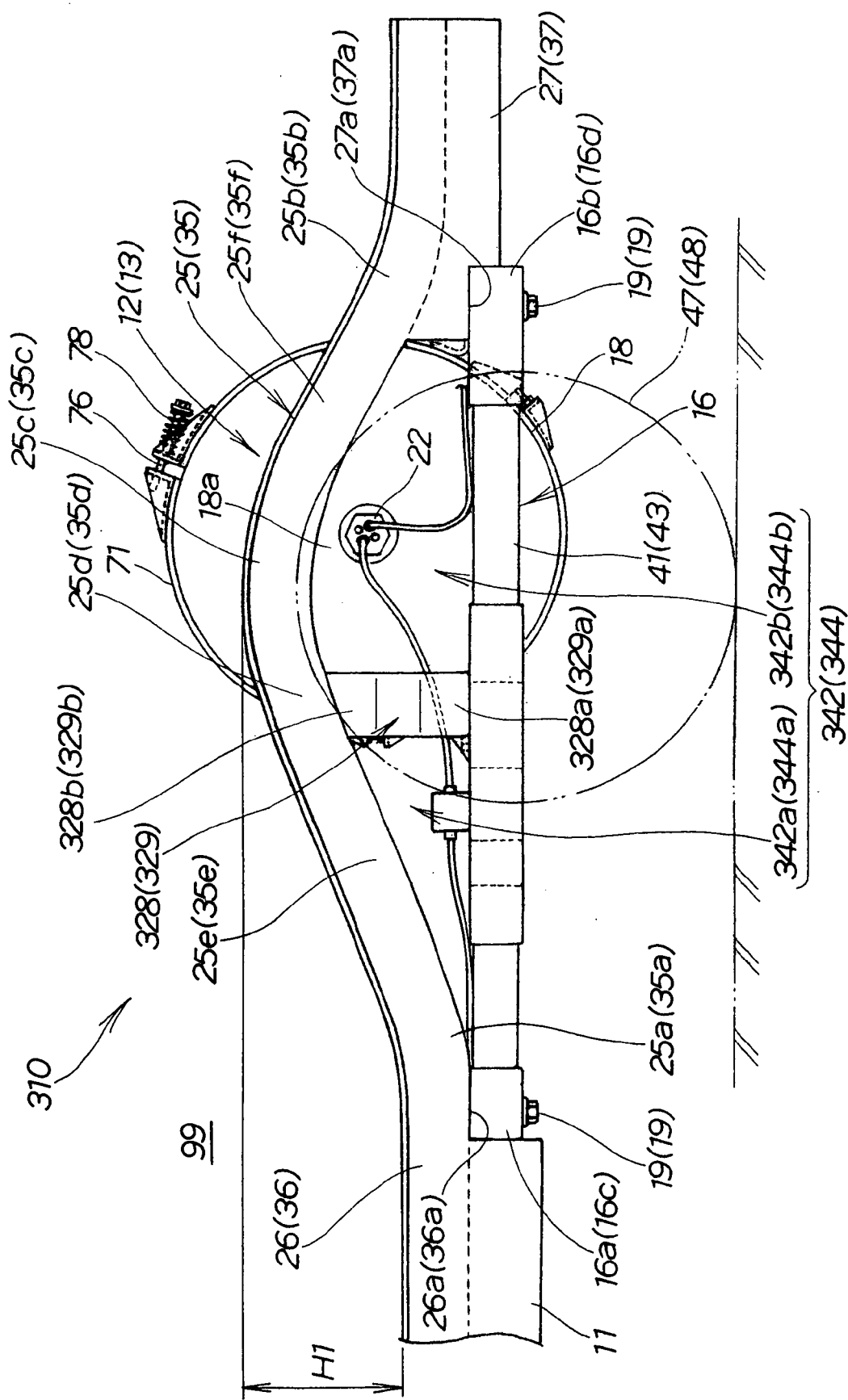
FIG. 10 is a side view of the rear structure of the gaseous fuel vehicle shown in FIG. 9.

For this, it is necessary to dispose the gaseous fuel tank 18 in the left area 42 shown in FIG. 2 (in a left rear area 342*b* in a third embodiment shown in FIG. 10).

Now, an operation of the rear structure 10 of the gaseous fuel vehicle in the first embodiment will be described with reference to FIGS. 6A and 6B.

Figure 6A:
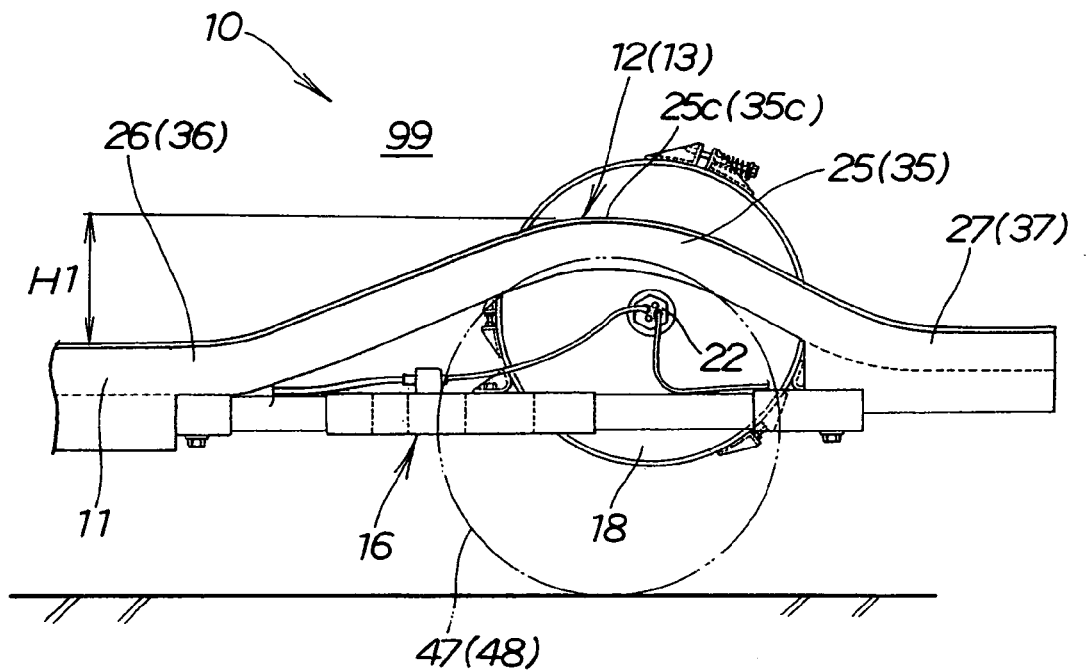
FIGS. 6A and 6B are diagrams illustrating an operation of the rear structure of the gaseous fuel vehicle in the first embodiment when a load is applied to the rear end of a rear frame member.

Referring to FIG. 6A, the left rear frame member 12 is a curved member including the left curved portion 25, the front linear portion 26 extending forward, and the rear linear portion 27 extending rearward.

The front linear portion 26 is lower than the highest portion 25*c* of the left curved portion 25 by H1, lowered to the height of the vehicle frame 11 located in front of the left rear frame member 12. The rear linear portion 27 is also lowered in line with the front linear portion 26.

Likewise, the right rear frame member 13 includes the right curved portion 35, the front linear portion 36 extending forward and the rear linear portion 37 extending rearward, constituting a curved member.

The front linear portion 36 is lower than the highest portion 35*c* of the right curved portion 35 by H1, lowered to the height of the vehicle frame 11 located in front of the right rear frame member 13. The rear linear portion 37 is also lowered in line with the front linear portion 36.

This arrangement results in a lowered floor surface (not shown) located on the front linear portions 26, 36 and nearby portions (that is, front inclined portions of the left and right curved portions 25, 35), and the rear linear portions 27, 37 and nearby portions (rear inclined portions of the left and right curved portions 25, 35).

Figure 6B:
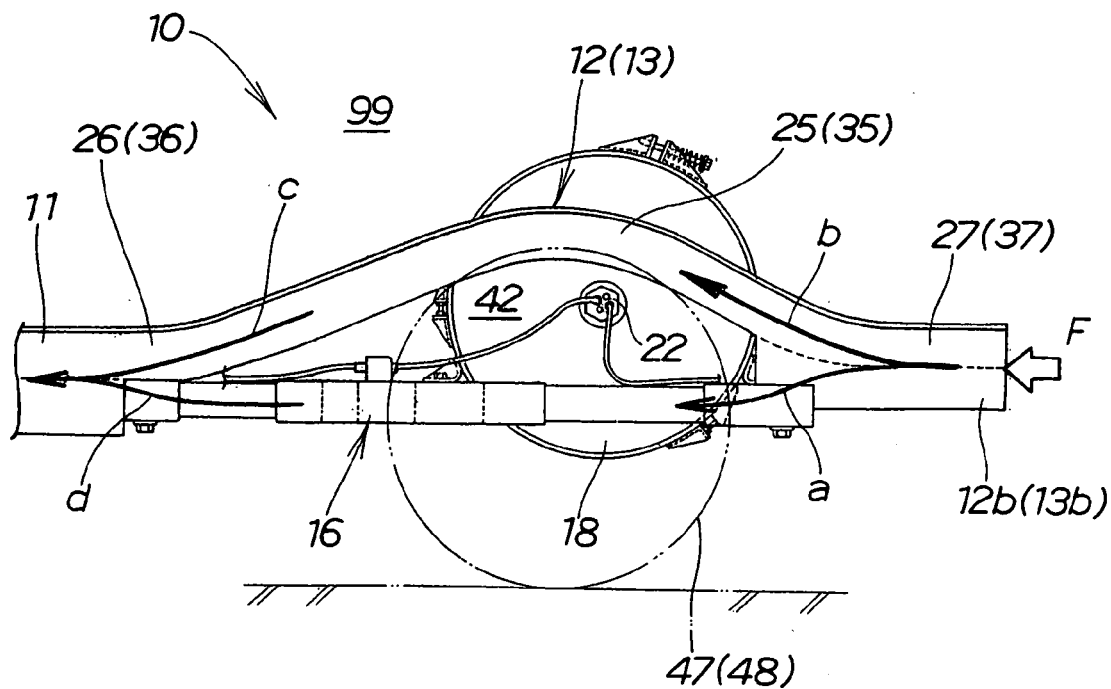

Referring to FIG. 6B, the front linear portions 26, 36 and the rear linear portions 27, 37 are lowered and arranged in a straight line, so that the front linear portions 26, 36, the rear linear portions 27, 37, and the support frame 16 are arranged in a straight line. When a load F is applied to rear portions 12*b*, 13*b* of the left and right rear frame members 12, 13, the load F is efficiently dispersed into the support frame 16 and the left and right rear frame members 12, 13 as shown by arrows a and b.

The load F is transmitted to the support frame 16 as shown by the arrow a, so that the load applied to the right left and right rear frame members 12, 13 as shown by the arrow b can be reduced. Therefore, the left and right rear frame members 12, 13 can be reduced in weight.

Further, since the left and right rear frame members 12, 13 are curved members, the load of the arrow b applied to the left and right rear frame members 12, 13 is transmitted through the left and right curved portions 25, 35 to the front linear portions 26, 36 as shown by arrow c.

The load dispersed as shown by the arrow a into the support frame 16 is transmitted through the linear support frame 16 to the front linear portions 26, 36 of the left and right rear frame members 12, 13 as shown by arrow d.

The front end portions of the left and right rear frame members 12, 13 (that is, the front linear portions 26, 36) are substantially collinearly continuous with the vehicle frame 11. Thus, the load transmitted to the front linear portions 26, 36 of the left and right rear frame members 12, 13 is efficiently transmitted to the vehicle frame 11 in front of the left and right rear frame members 12, 13. As a result, the load transmitted from the front linear portions 26, 36 to the vehicle frame 11 is received by the vehicle frame 11 in a suitable manner.

The left and right curved portions 25, 35 of the left and right rear frame members 12, 13 bulge upward. Therefore, when a load F is applied to the rear portions 12*b*, 13*b* of the left and right rear frame members 12, 13, the left and right curved portions 25, 35 tend to deform upward, or outward. For this reason, the tank valve 22 of the gaseous fuel tank 18 is disposed in the left area 42 enclosed by the left curved portion 25 and the support frame 16. When the left curved portion 25 is deformed, the left curved portion 25 is deformed upward, or in a direction away from the tank valve 22.

Since the left curved portion 25 of the left rear frame member 12 is thus deformed in a direction away from the tank valve 22, the left curved portion 25 is prevented from contacting the tank valve 22.

Now, a rear structure of a gaseous fuel vehicle according to a second embodiment will be described with reference to FIG. 7. In the description of the second embodiment, the same components as those in the rear structure 10 of the gaseous fuel vehicle in the first embodiment are given the same reference numerals to avoid redundant description.

Figure 7:
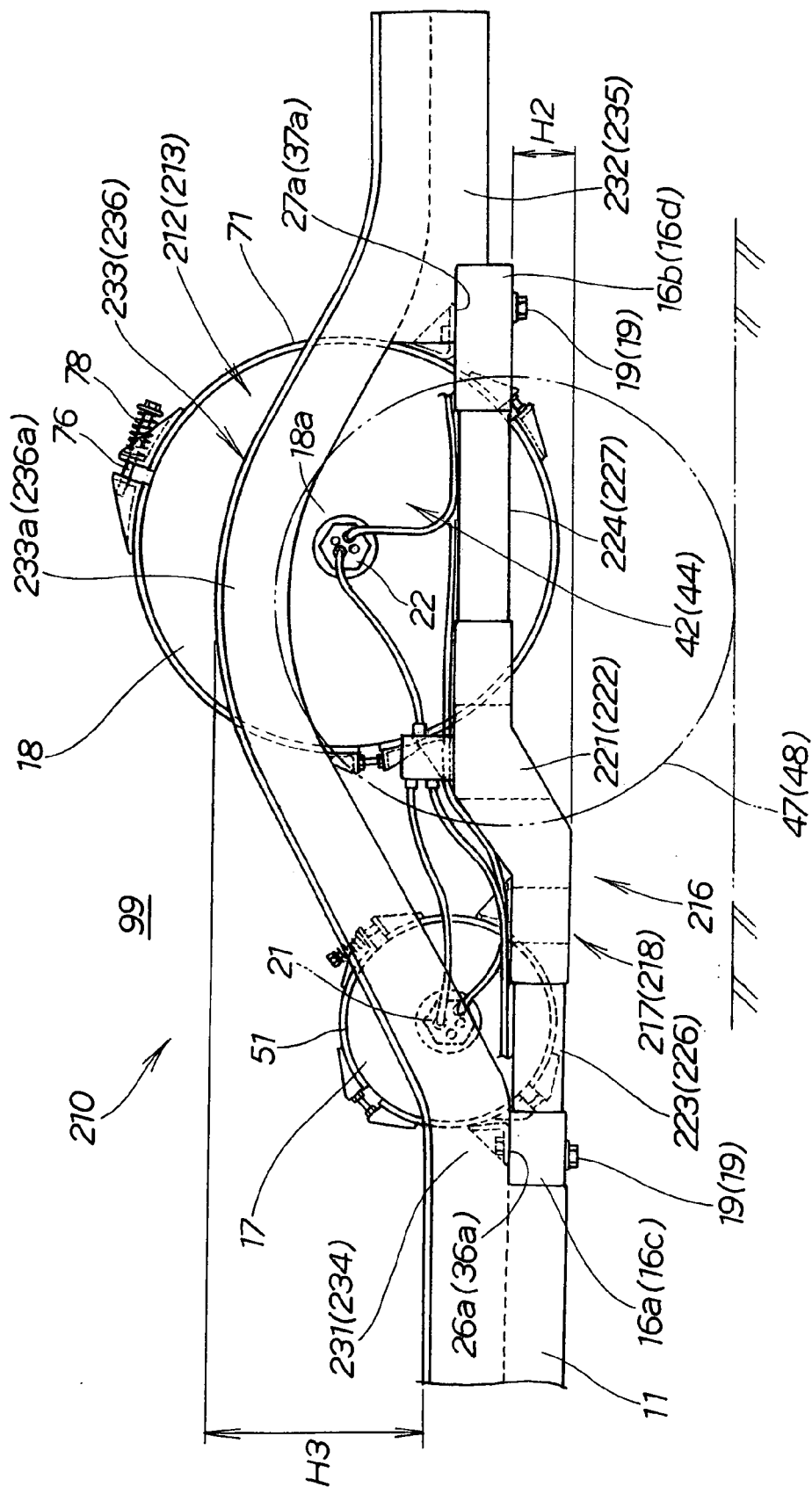
FIG. 7 is a side view of a rear structure of a gaseous fuel vehicle according to a second embodiment of the present invention.

A rear structure 210 of a gaseous fuel vehicle in the second embodiment shown in FIG. 7 includes a support frame 216 which is different from the support frame 16 in the first embodiment, and the other components are identical to those in the first embodiment.

A left side member 217 of the support frame 216 includes a forward-sloping inclined portion 221 in its middle portion. A front portion 223 of the inclined portion 221 is lower than a rear portion 224 of the inclined portion 221 by distance H2.

Like the left side member 217, a right side member 218 includes a forward-sloping inclined portion 222 in its middle portion. A front portion 226 of the inclined portion 222 is lower than a rear portion 227 of the inclined portion 222 by distance H2.

A left rear frame member (rear frame member) 212 is a curved member in which a front linear portion 231 is lower than a rear linear portion 232 by distance H2 in accordance with the left side member 217, and the front linear portion 231 and the rear linear portion 232 are continuous with a left curved portion (curved portion) 233 bulging out upward.

Likewise, a right rear frame member (rear frame member) 213 is a curved member in which a front linear portion 234 is lower than a rear linear portion 235 by distance H2 in accordance with the right side member 218, and the front linear portion 234 and the rear linear portion 235 are continuous with a right curved portion (curved portion) 236 bulging out upward.

Since the front linear portions 231, 234 of the left and right rear frame members 212, 213 are lower than the rear linear portions 232, 235 by H2, the front linear portions 231, 234 can be lowered further from the position of the front linear portions 26, 36 in the first embodiment (see FIG. 2) by distance H2.

Thus, the front linear portions 231, 234 are lower than highest portions 233a, 236a of the left and right curved portions 233, 236 by distance H3. The distance H3 is set larger than the distance H1 in the first embodiment (see FIG. 2). With this, a floor surface (not shown) located on the front linear portions 231, 234 can be lowered more than the front linear portions 26, 36 in the first embodiment (see FIG. 2), resulting in a further lowered floor in a passenger compartment 99.

On the support frame 216, a front gaseous fuel tank 17 is provided in front of a gaseous fuel tank 18. The front gaseous fuel tank 17 has a smaller diameter than the gaseous fuel tank 18, and is provided with a tank valve 21 at the center of the left end, for example.

The front gaseous fuel tank 17 is attached to the support frame 216 by a pair of front holding band units 51, 51, like the gaseous fuel tank 18. The front holding band units 51 are members formed substantially the same as holding band units 71.

Now, an operation of the rear structure 210 of the gaseous fuel vehicle according to the second embodiment shown in FIG. 7 will be described with reference to FIGS. 8A and 8B.

Figure 8A:
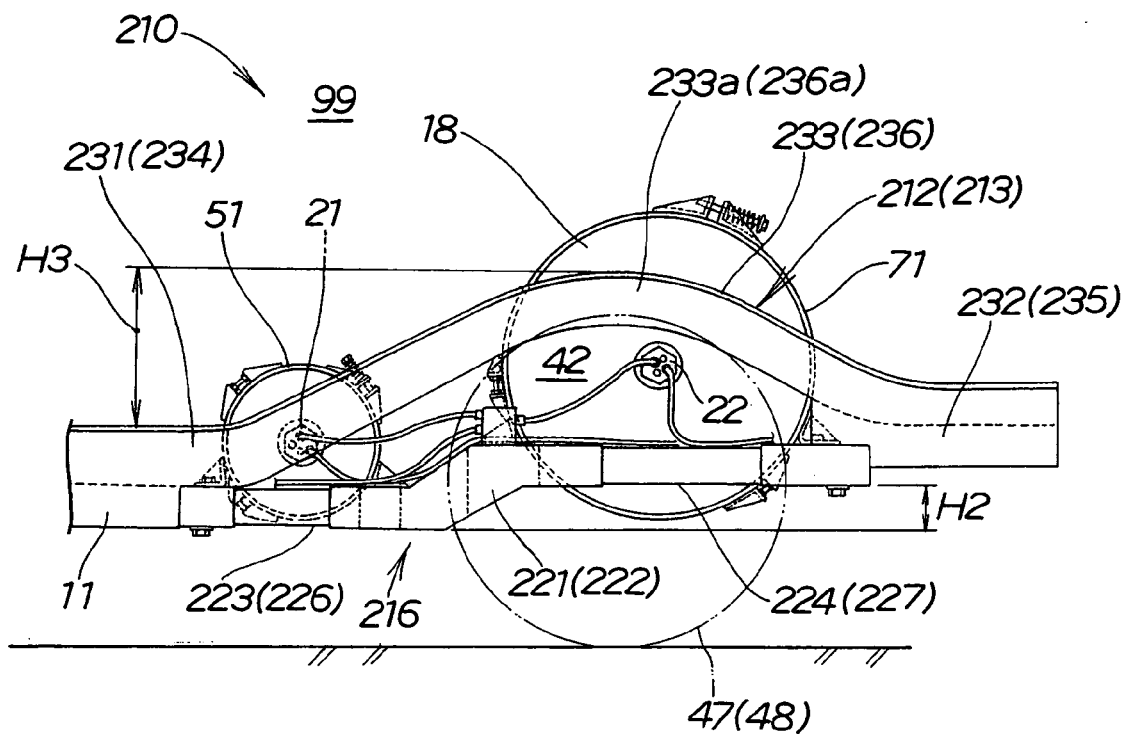
FIGS. 8A and 8B are diagrams illustrating an operation of the rear structure of the gaseous fuel vehicle in the second embodiment shown in FIG. 7 when a load is applied to the rear end of a rear frame member.

Referring to FIG. 8A, the front linear portion 231 of the left rear frame member 212 is lowered to the height of a vehicle frame 11 in front of the left rear frame member 212.

Likewise, the front linear portion 234 of the right rear frame member 213 is lowered to the height of the vehicle frame 11 in front of the right rear frame member 213.

The front linear portions 231, 234 of the left and right rear frame members 212, 213 are lowered to the height of the vehicle frame 11 as described above, so that connections between front end portions (that is, front linear portions 231, 234) of the left and right rear frame members 212, 213 and the vehicle frame 11 can be configured simply, or eliminated, for simplification and weight reduction of the vehicle rear structure 210.

The front linear portions 231, 234 of the left and right rear frame members 212, 213 are lower than the rear linear portions 232, 235 by distance H2, and lower than the highest portions 233a, 236a of the left and right curved portions 233, 236 by distance H3.

Therefore, a floor surface (not shown) located on the front linear portions 231, 234 can be lowered more than the front linear portions 26, 36 in the first embodiment (see FIG. 2), resulting in a lower floor in the passenger compartment 99 and a further enlarged space in the passenger compartment 99.

Figure 8B:
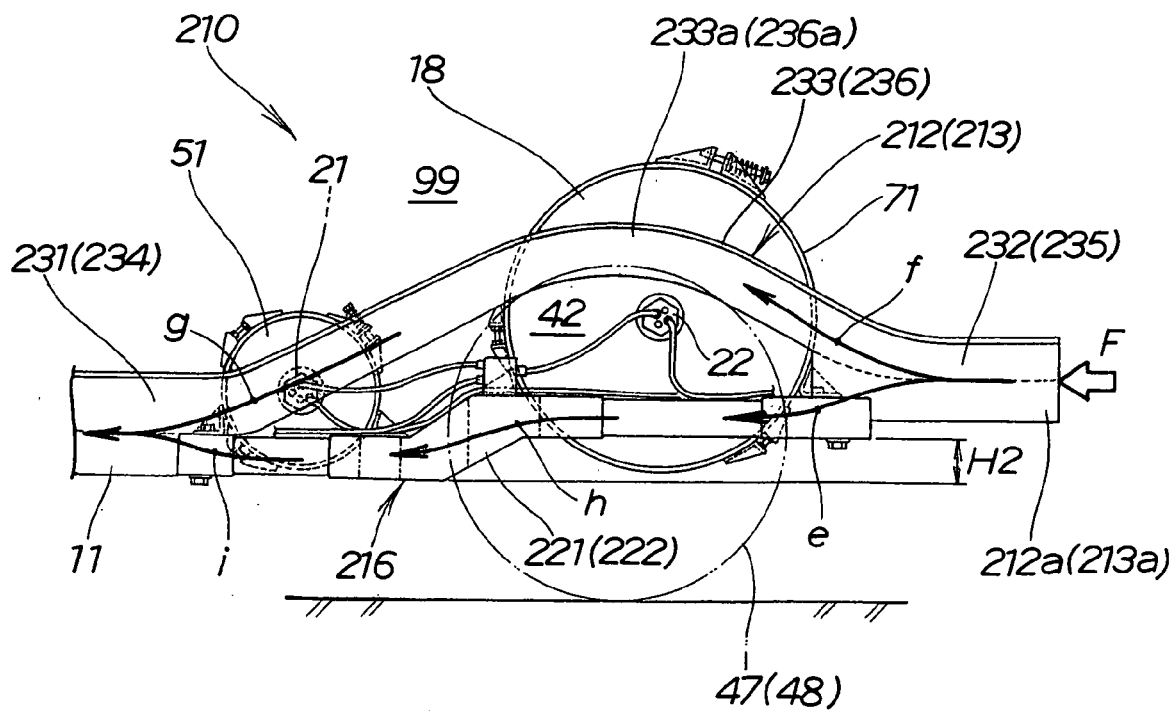

Referring to FIG. 8B, the left and right rear frame members 212, 213 are curved members, so that the front linear portions 231, 234 and the rear linear portions 232, 235 are lowered.

Since the front linear portions 231, 234 of the left and right rear frame members 212, 213 are slightly lower than the rear linear portions 232, 235 only by distance H2, the front linear portions 231, 234 and the rear linear portions 232, 235 can be arranged in a substantially straight line. Accordingly, the support frame 216 connected to the front linear portions 213, 234 and the rear linear portions 232, 235 is formed substantially linearly. Thus, the front linear portions 231, 234, the rear linear portions 232, 235 and the support frame 216 are arranged in a substantially straight line.

When a load F is applied to rear portions 212a, 213a of the left and right rear frame members 212, 213, the load F is dispersed into the support frame 216 and the left and right rear frame members 212, 213 as shown by arrows e and f.

Since the load F is also dispersed into the support frame 216 as shown by the arrow e, the load applied to the left and right rear frame members 212, 213 as shown by the arrow f can be reduced, resulting in a reduced weight of the left and right rear frame members 212, 213.

Since the left and right rear frame members 212, 213 are curved members, the load of the arrow f is efficiently transmitted through the left and right curved portions 233, 236 to the front linear portions 231, 234 as shown by arrow g.

The load dispersed into the support frame 216 as shown by the arrow e is transmitted to the center of the substantially linear support frame 216 as shown by arrow h, and is further transmitted to the front linear portions 231, 234 of the left and right rear frame members 212, 213 as shown by arrow i.

The front end portions of the left and right rear frame members 212, 213 (that is, the front linear portions 231, 234) are substantially collinear with the vehicle frame 11. Therefore, the load transmitted to the front linear portions 231, 234 of the left and right rear frame members 212, 213 is efficiently transmitted to the vehicle frame 11, and the vehicle frame 11 receives the load.

The left and right curved portions 233, 236 of the left and right rear frame members 212, 213 bulge out upward. When a load F is applied to the rear portions 212b, 213b of the left and right rear frame members 212, 213, the left and right curved portions 233, 236 tend to deform upward, or outward.

For this reason, the tank valve 22 of the gaseous fuel tank 18 is disposed in a left area 42 enclosed by the left curved portion 233 and the support frame 216.

When the left curved portion 233 is deformed by the load F applied to the rear portion 212b of the left rear frame member 212, the left curved portion 233 is deformed upward, or in a direction away from the tank valve 22, whereby the left curved portion 233 is prevented from contacting the tank valve 22.

As described above, the rear structure 210 of the gaseous fuel vehicle in the second embodiments can provide the same effects as the rear structure 10 of the gaseous fuel vehicle in the first embodiment.

The first embodiment has been described with the example in which a load F is applied to the rear portions 12b, 13b of the left and right rear frame members 12, 13, which is not limiting. The same effects can be provided even when a load F is applied to either one of the rear portions 12b, 13b of the left and right rear frame members 12, 13.

The second embodiment has been described with the example in which a load F is applied to the rear portions 212a, 213a of the left and right rear frame members 212, 213, which is not limiting. The same effects can be provided even when a load F is applied to either one of the rear portions 212a, 213a of the left and right rear frame members 212, 213.

The first and second embodiments have been described with the example in which the tank valve 22 is provided at the left end 18a of the gaseous fuel tank 18, which is not limiting. The same effects can be provided even when the tank valve 22 is provided at the right end of the gaseous fuel tank 18.

The first and second embodiments have been described with the example in which the tank valve 22 of the gaseous fuel tank 18 is disposed in the left area 42. The tank valve 22 of the gaseous fuel tank 18 may alternatively be disposed in the right area 44.

Now, the configuration of a rear structure 310 of a gaseous fuel vehicle according to a third embodiment will be described with reference to FIGS. 9 to 11. In the description of the third embodiment, the same components as those in the rear structure 10 of the gaseous fuel vehicle in the first embodiment are given the same reference numerals to avoid redundant description.

Figure 9:
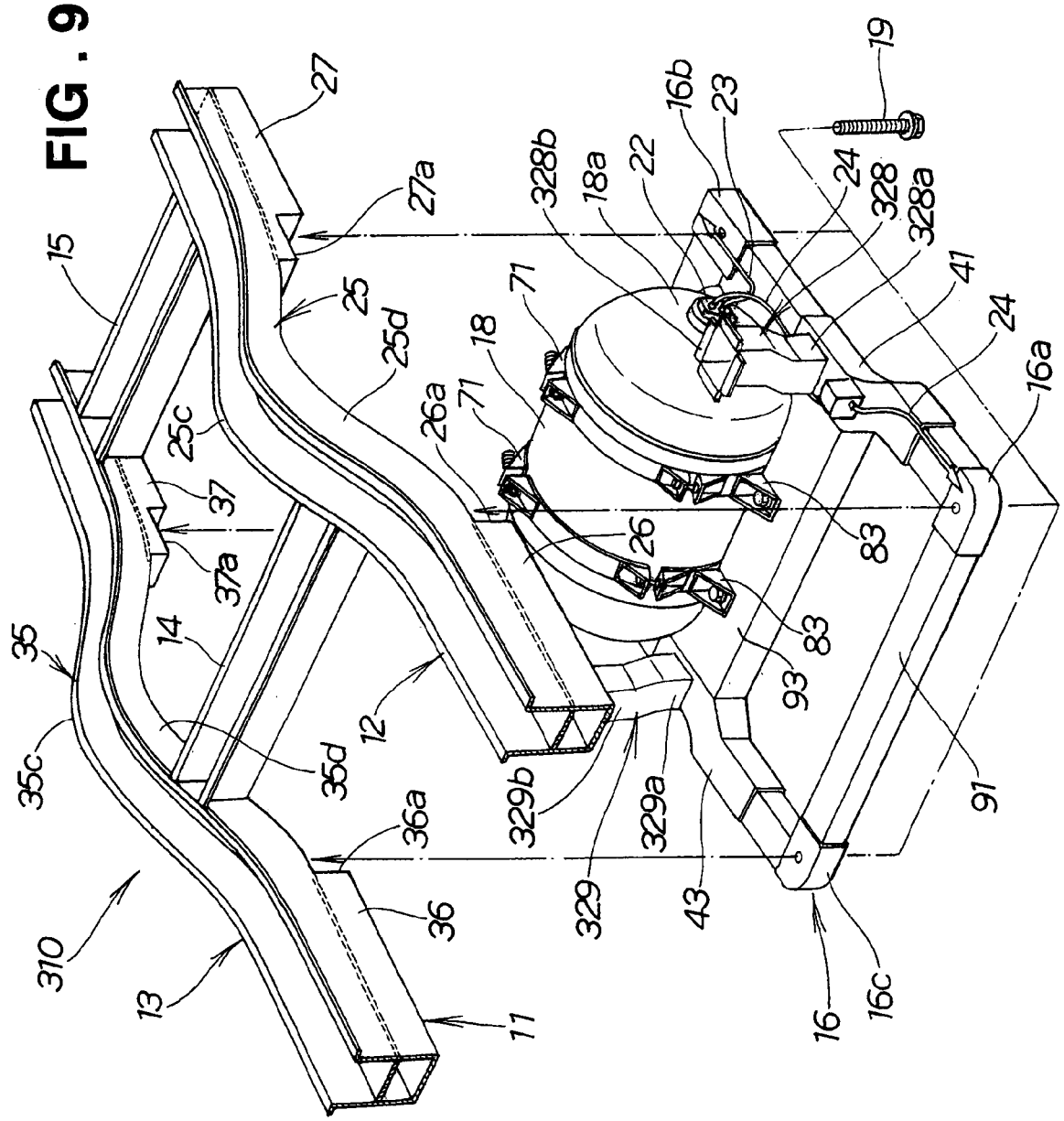
FIG. 9 is an exploded perspective view of a rear structure of a gaseous fuel vehicle according to a third embodiment of the present invention.
Figure 11:
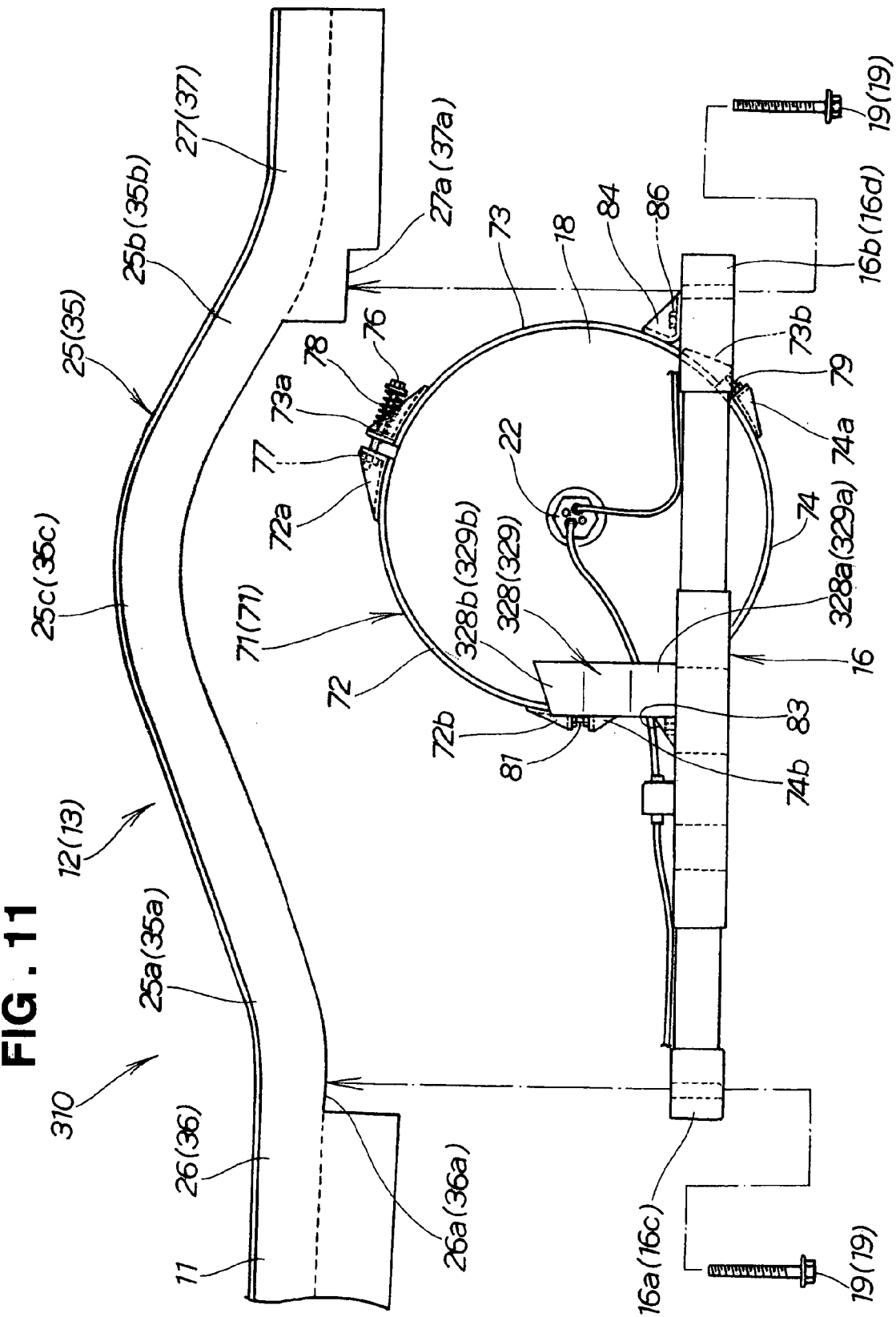
FIG. 11 is an exploded side view of the rear structure of the gaseous fuel vehicle shown in FIG. 10.

The rear structure 310 of the gaseous fuel vehicle in the third embodiment shown in FIGS. 9 to 11 is different from the rear structure 10 in the first embodiment only in that connecting members 328, 329 are interposed between a support frame 16 and left and right rear frame members 12, 13, and the other components are the same as in the first embodiment. Specifically, in the rear structure 310 of the gaseous fuel vehicle in the third embodiment, the support frame 16 and the left rear frame member 12 are connected by the left connecting member (connecting member) 328, and the support frame 16 and the right rear frame member 13 are connected by the right connecting member (connecting member) 329.

The support frame 16 includes a left side member 41 constituting the left frame member, and a right side member 43 constituting the right frame member.

The left connecting member 328 has a lower end 328a joined to an upper surface of a substantially middle portion of the left side member 41, and an upper end 328b connected to a forward portion 25d located in front of a highest portion 25c of a left curved portion 25.

The right connecting member 329 has a lower end 329a joined to an upper surface of a substantially middle portion of the right side member 43, and an upper end 329b connected to a forward portion 35d located in front of a highest portion 35c of a right curved portion 35.

That is, as shown in FIG. 10, the left connecting member 328 is joined to the forward portion 25d of the left curved portion 25, so that a left area 342 is divided into a left front area 342a and a left rear area (area) 342b.

The left front area 342a is an area enclosed by the left connecting member 328, a curved portion not including the highest portion 25c of the left curved portion 25 (that is, a front curved portion) 25e, and the front half of the left side member 41 of the support frame 16.

The left rear area 342b is an area enclosed by the left connecting member 328, a curved portion including the highest portion 25c of the left curved portion 25 (that is, a rear curved portion) 25f, and the rear half of the left side member 41 of the support frame 16.

A tank valve 22 attached to a gaseous fuel tank 18 is disposed in the left rear area 342b to be protected by the left rear frame member 12, the support frame 16 and the left connecting member 328.

Likewise, the right connecting member 329 is joined to the forward portion 35d of the right curved portion 35, so that a right area 344 is divided into a right front area 344a and a right rear area (area) 344b.

The right front area 344a is an area enclosed by the right connecting member 329, a curved portion not including the highest portion 35c of the right curved portion 35 (that is, a front curved portion) 35e, and the front half of the right side member 43 of the support frame 16.

The right rear area 344b is an area enclosed by the right connecting member 329, a curved portion including the highest portion 35c of the right curved portion 35 (that is, a rear curved portion) 35f, and the rear half of the right side member 43 of the support frame 16.

Now, an operation of the rear structure 310 of the gaseous fuel vehicle in the third embodiment will be described with reference to FIGS. 12A and 12B.

Figure 12A:
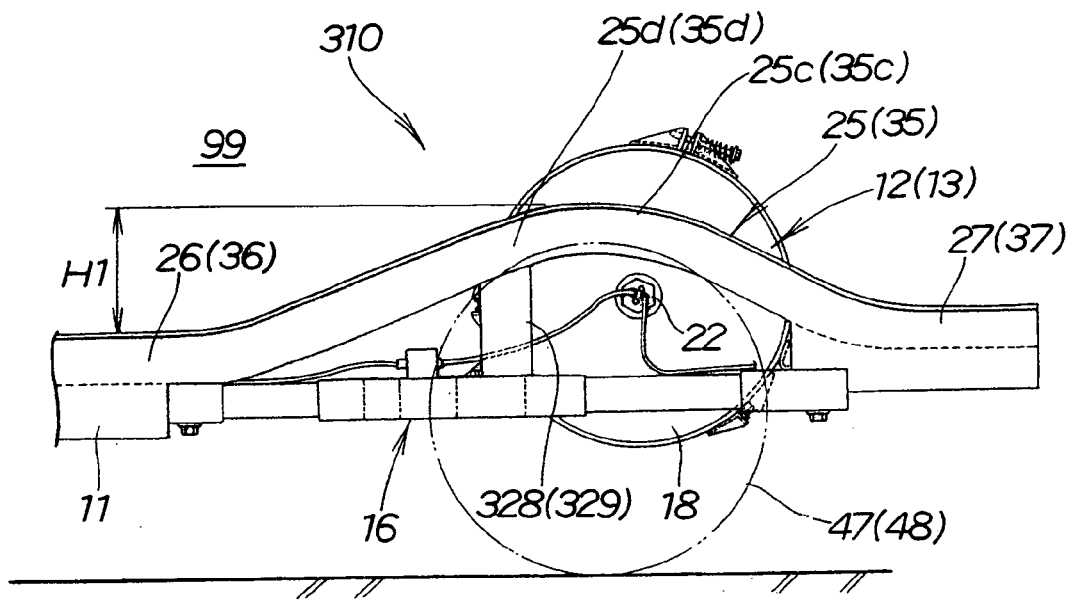
FIGS. 12A and 12B are diagrams illustrating an operation of the rear structure of the gaseous fuel vehicle in the third embodiment when a load is applied to the rear end of a rear frame member.

Referring to FIG. 12A, the left rear frame member 12 is a curved member including the left curved portion 25, a front linear portion 26 extending forward, and a rear linear portion 27 extending rearward. The front linear portion 26 is lower than the highest portion 25c of the left curved portion 25 by H1, lowered to the height of a vehicle frame 11 located in front of the left rear frame member 12. The rear linear portion 27 is also lowered in line with the front linear portion 26.

Likewise, the right rear frame member 13 is a curved member including the right curved portion 35, a front linear portion 36 extending forward, and a rear linear portion 27 extending rearward. The front linear portion 36 is lower than the highest portion 35c of the right curved portion 35 by H1, lowered to the height of the vehicle frame 11 located in front of the right rear frame member 13. The rear linear portion 27 is also lowered in line with the front linear portion 36.

This arrangement results in a lowered floor surface (not shown) located on the front linear portions 26, 36 and nearby portions (that is, front inclined portions of the left and right curved portions 25, 35), and the rear linear portions 27, 37 and nearby portions (that is, rear inclined portions of the left and right curved portions 25, 35). Connections (not shown) between front end portions of the left and right rear frame members 12, 13 (that is, the front linear portions 26, 36) and the vehicle frame 11 are configured simply, or eliminated, for simplification and weight reduction of the vehicle rear structure 310.

Figure 12B:
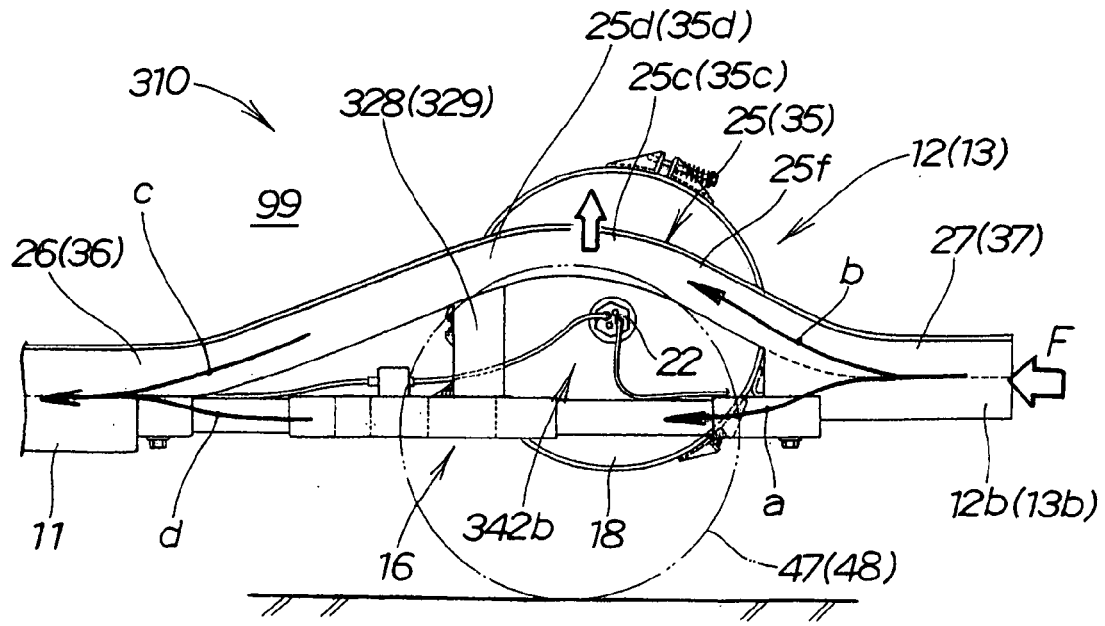

Referring to FIG. 12B, the left and right connecting members 328, 329 are extended upright from the upper surfaces of the support frame 16, and the left and right connecting members 328, 329 are connected to the forward portions 25d, 35d in front of the highest portions 25c, 35c of the left and right curved portions 25, 35. When a load F is applied to rear portions 12b, 13b of the left and right rear frame members 12, 13, the left and right curved portions 25, 35 are supported by the left and right connecting members 28, 29, respectively, and prevented from deforming upward as shown by an arrow.

The transmission of the load F applied to the rear portions 12b, 13b of the left and right rear frame members 12, 13 will be described below.

When the load F is applied to the rear portions 12b, 13b of the left and right rear frame members 12, 13, the load F is dispersed into the support frame 16 and the left and right rear frame members 12, 13 as shown by arrows a and b. Thus, the load applied to the left and right rear frame members 12, 13 as shown by the arrow b can be reduced, resulting in a reduced weight of the left and right rear frame members 12, 13.

Since the left and right curved portions 25, 35 bulge out upward, when the load is applied to the left and right rear frame members 12, 13 as shown by the arrow b, an upward deforming force acts on the left and right curved portions 25, 35 as shown by the arrow. However, the left and right curved portions 25, 35 are prevented from deformation by the left and right connecting members 28, 29. Thus, the load of the arrow b is efficiently transmitted through the left and right curved portions 25, 35 to the front linear portions 26, 36 as shown by arrow c.

The load dispersed into the support frame 16 as shown by the arrow a is transmitted through the linear support frame 16 to the front linear portions 26, 36 of the left and right rear frame members 12, 13 as shown by arrow d.

Since the front end portions of the left and right rear frame members 12, 13 (that is, the front linear portions 26, 36) are substantially collinearly joined to the vehicle frame 11, the load transmitted to the front linear portions 26, 36 of the left and right rear frame members 12, 13 as shown by the arrows c and d is efficiently transmitted to the vehicle frame 11, and is received by the vehicle frame 11 appropriately.

The left connecting member 328 connected to the left curved portion 25 of the left rear frame member 12 prevents deformation of the left curved portion 25. Thus, the left rear area 342b enclosed by the left connecting member 328, the curved portion including the left highest portion 25c (that is, the rear curved portion) 25f and the support frame 16 can be sufficiently maintained. The tank valve 22 of the gaseous fuel tank 18 is disposed in the maintained area 342b. Even when a load F is applied to the rear portions 12b, 13b of the left and right rear frame members 12, 13, the left rear area 42b is maintained, and the left rear frame member 12 is prevented from interfering with the tank valve 22.

Now, a rear structure of a gaseous fuel vehicle according to a fourth embodiment will be described with reference to FIG. 13. In the description of the fourth embodiment, the same components as those in the rear structure 310 of the gaseous fuel vehicle in the third embodiment shown in FIGS. 9 to 11 are given the same reference numerals to avoid redundant description.

Figure 13:
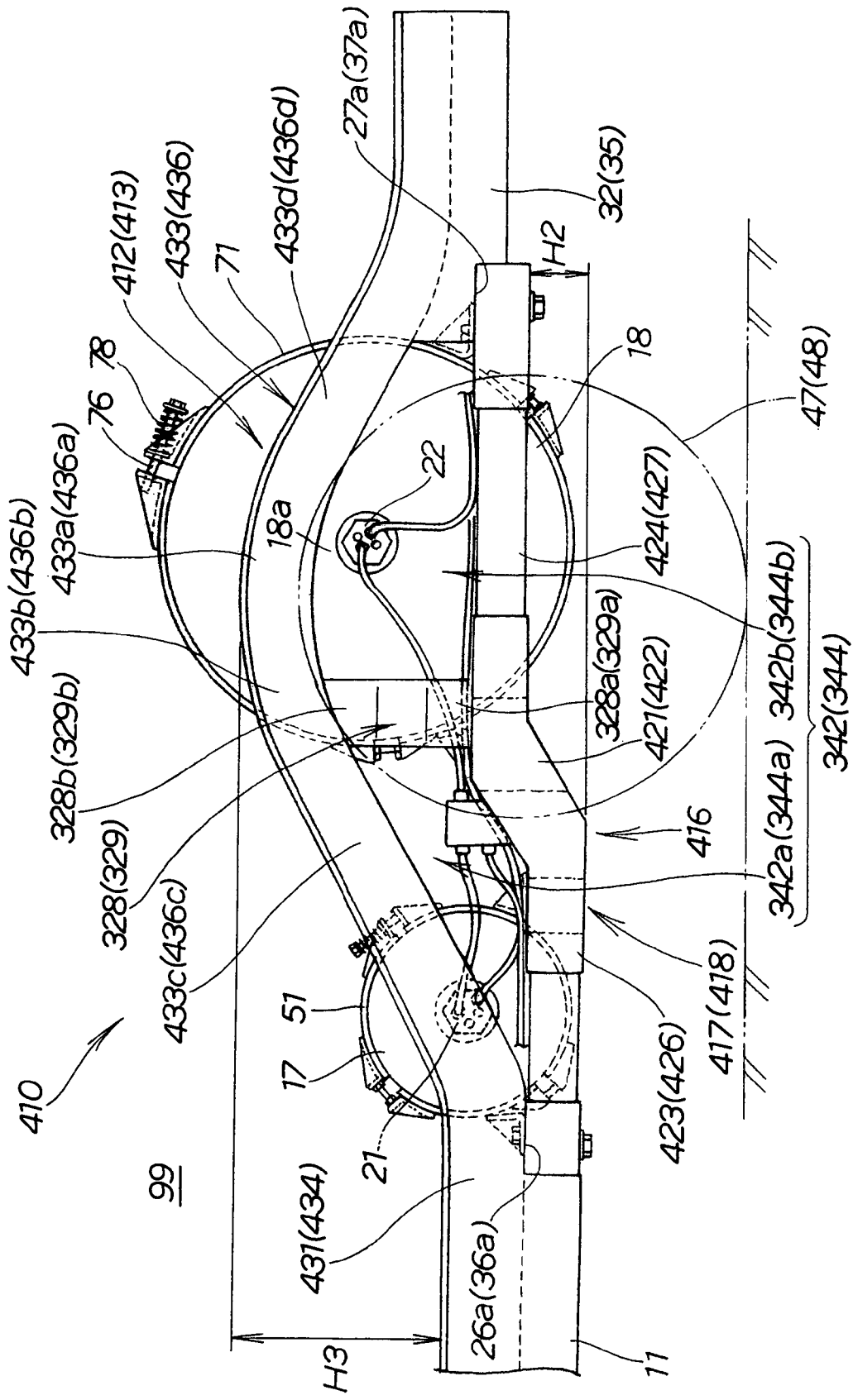
FIG. 13 is a side view of a rear structure of a gaseous fuel vehicle according to a fourth embodiment of the present invention.

A rear structure 410 of a gaseous fuel vehicle in the fourth embodiment shown in FIG. 13 includes a support frame 416 which is different from the support frame 16 in the third embodiment. The other components are identical to those in the third embodiment.

A left side member 417 of the support frame 416 includes a forward-sloping inclined portion 421 in its middle portion, as in the second embodiment shown in FIG. 7. A front portion 423 of the inclined portion 421 is lower than a rear portion 424 of the inclined portion 421 by distance H2.

Like the left side member 417, the right side member 418 includes a forward-sloping inclined portion 422 in its middle portion. A front portion 426 of the inclined portion 422 is lower than a rear portion 427 of the inclined portion 422 by distance H2.

A left rear frame member (rear frame member) 412 is a curved member having a front linear portion 431 lower than a rear linear portion 432 by distance H2 in accordance with the left side member 417. The front linear portion 431 and the rear linear portion 432 are continuous with a left curved portion (curved portion) 433 bulging out upward.

Likewise, a right rear frame member (rear frame member) 413 is a curved member having a front linear portion 434 lower than a rear linear portion 435 by distance H2 in accordance with the right side member 418. The front linear portion 434 and the rear linear portion 435 are continuous with a right curved portion (curved portion) 436 bulging out upward.

Since the front linear portions 431, 434 of the left and right rear frame members 412, 413 are lower than the rear linear portions 432, 435 by distance H2, the front linear portions 431, 434 can be further lowered from the position of the front linear portions 26, 36 (see FIG. 10) in the third embodiment by H2.

Thus, the front linear portions 431, 434 are lower than highest portions 433a, 436a of left and right curved portions 433, 436 by distance H3. The distance H3 is set larger than the distance H1 in the third embodiment (see FIG. 10). With this, a floor surface (not shown) located on the front linear portions 431, 434 can be lowered more than the front linear portions 26, 36 (see FIG. 10) in the third embodiment, resulting in a further lowered floor in a passenger compartment 99.

Like the rear structure 310 of the gaseous fuel vehicle in the third embodiment, the rear structure 410 of the gaseous fuel vehicle in the fourth embodiment is provided with a left connecting member 328 extended upright from the left side member 417 of the support frame 416 and connected to a forward portion 433b in front of the highest portion 433a of the left curved portion 433, and a right connecting member 329 extended upright from the right side member 418 of the support frame 416 and connected to a forward portion 436b in front of the highest portion 436a of the right curved portion 436.

Since the left connecting member 328 is connected to the forward portion 433b, a left area 342 is divided into a left front area 342a and a left rear area (area) 342b.

Specifically, the left front area 342a is an area enclosed by the left connecting member 328, a curved portion not including the highest portion 433a (that is, front curved portion) 433c, and the front half of the left side member 417 of the support frame 416.

The left rear area 342b is an area enclosed by the left connecting member 328, a curved portion including the highest portion 433a (that is, rear curved portion) 433d, and the rear half of the left side member 417 of the support frame 416. A tank valve 22 attached to a gaseous fuel tank 18 is disposed in the left rear area 342b.

The left connecting member 329 has a lower end 328a connected to an upper surface of a substantially middle portion of the left side member 417, and an upper end 328b connected to the forward portion 433b in front of the highest portion 433a of the left curved portion 433.

Likewise, the right connecting member 329 has a lower end 329a connected to an upper surface of a substantially middle portion of the right side member 418, and an upper end 329b connected to the forward portion 436b in front of the highest portion 436a of the right curved portion 436.

Since the right connecting member 329 is connected to the forward portion 436b, a right area 344 is divided into a right front area 344a and a right rear area 344b.

Specifically, the right front area 344a is an area enclosed by the right connecting member 329, a curved portion not including the highest portion 436a (that is, a front curved portion) 436c, and the front half of the right side member 418.

The right rear area 344b is an area enclosed by the right connecting member 329, a curved portion including the highest portion 436a (that is, a rear curved portion) 436d, and the rear half of the right side member 118.

On the support frame 416, a front gaseous fuel tank 17 is provided in front of the gaseous fuel tank 18. The front gaseous fuel tank 17 has a smaller diameter than the gaseous fuel tank 18, and is provided with a tank valve 21 at the center of the left end, for example.

The front gaseous fuel tank 17 is attached to the support frame 416 by a pair of front holding band units 51, 51, like the gaseous fuel tank 18. The front holding band units 51 are members formed substantially the same as holding band units 71.

Now, an operation of the rear structure 410 of the gaseous fuel vehicle according to the fourth embodiment shown in FIG. 13 will be described with reference to FIGS. 14A and 14B.

Figure 14A:
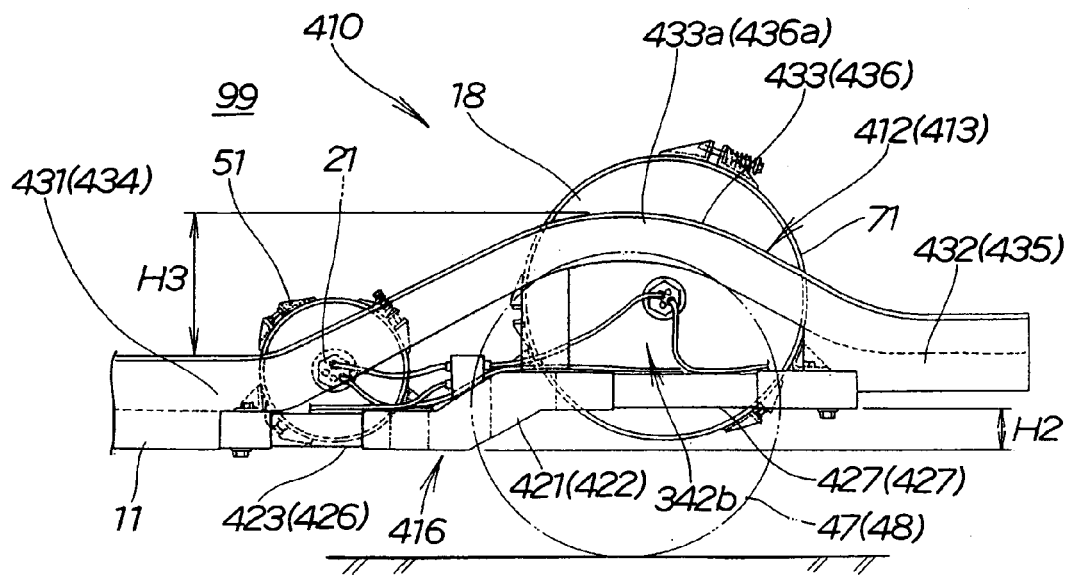
FIGS. 14A and 14B are diagrams illustrating an operation of the rear structure of the gaseous fuel vehicle in the fourth embodiment shown in FIG. 13 when a load is applied to the rear end of a rear frame member.

Referring to FIG. 14A, the front linear portion 431 of the left rear frame member 412 is lowered to the height of a vehicle frame 11 in front of the left rear frame member 412.

Likewise, the front linear portion 434 of the right rear frame member 413 is lowered to the height of the vehicle frame 11 in front of the right rear frame member 413.

Since the front linear portions 431, 434 of the left and right rear frame members 412, 413 are lowered to the height of the vehicle frame 11 as described above, connections (not shown) between front end portions (that is, the front linear portions 431, 434) of the left and right rear frame members 412, 413 and the vehicle frame 11 is configured simply, or eliminated, resulting in simplification and weight reduction of the vehicle rear structure 410.

The front linear portions 431, 434 of the left and right rear frame members 412, 413 are lower than the rear linear portions 432, 435 by distance H2, and lower than the highest portions 433a, 436a of the left and right curved portions 433, 436 by distance H3.

Therefore, a floor surface (not shown) located on the front linear portions 431, 434 can be lowered more than the front linear portions 26, 36 in the third embodiment (see FIG. 10), resulting in a lowered floor in a passenger compartment 99 and a further enlarged space in the passenger compartment 99.

Figure 14B:
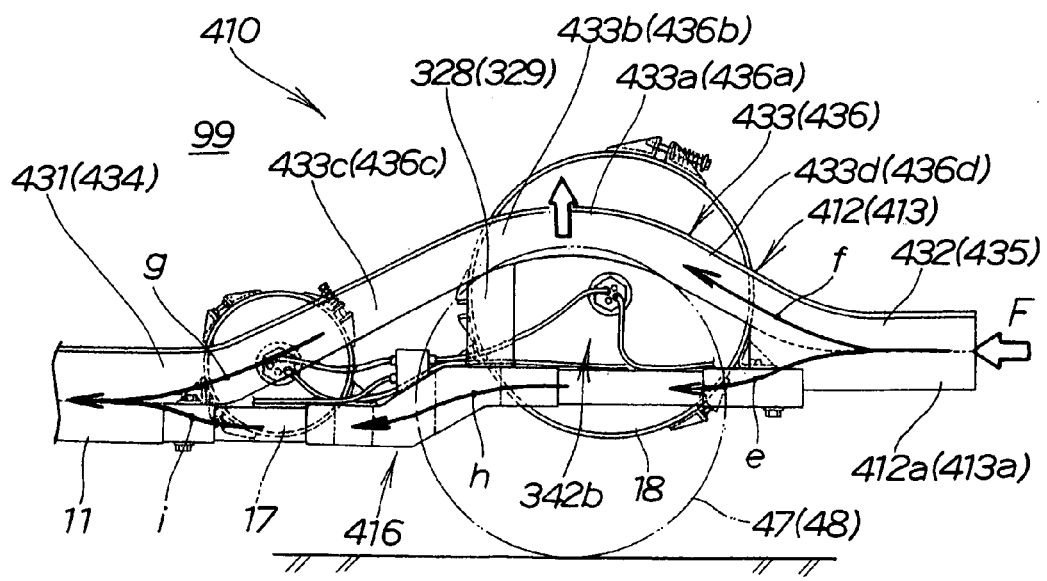

Referring to FIG. 14B, the left and right rear frame members 412, 413 are curved members, so that the front linear portions 431, 434 and the rear linear portions 432, 435 are lowered.

Since the front linear portions 431, 434 of the left and right rear frame members 412, 413 are slightly lower than the rear linear portions 432, 435 only by distance H2, the front linear portions 431, 434 and the rear linear portions 432, 435 can be arranged in a substantially straight line. Thus, the support frame 416 connected to the front linear portions 413, 434 and the rear linear portions 432, 435 is formed substantially linearly. Accordingly, the front linear portions 431, 434, the rear linear portions 432, 435 and the support frame 416 are arranged in a substantially straight line.

Since the support frame 416 is connected to the left and right curved portions 433, 436 by the left and right connecting members 328, 329 as described above, when a load F is applied to rear portions 112a, 113a of the left and right rear frame members 412, 413, the left and right curved portions 433, 436 are supported by the left and right connecting members 328, 329, respectively, and prevented from deforming upward as shown by an arrow.

The transmission of the load F applied to the rear portions 412a and 413a of the left and right rear frame members 412, 413 will be described below.

When the load F is applied to the rear portions 412a, 413a of the left and right rear frame members 412, 413, the load F is dispersed into the support frame 416 and the left and right rear frame members 412, 413 as shown by arrows e and f.

Since the load F is also dispersed into the support frame 416 as shown by the arrow e, the load applied to the left and right rear frame members 412, 413 as shown by the arrow f can be reduced, resulting in a reduced weight of the left and right rear frame members 412, 413.

Since the left and right curved portions 433, 436 are members bulging out upward, when the load is applied to the left and right rear frame members 412, 413 as shown by the arrow f, an upward deforming force acts on the left and right curved portions 433, 436 as shown by the arrow. However, as described above, the left and right curved portions 433, 436 are connected to the left and right connecting members 328, 329. When the load is applied to the left and right rear frame members 412, 413 as shown by the arrow f, the left and right curved portions 133, 136 are prevented from deformation.

Since the left and right rear frame members 412, 413 are curved members, the load of the arrow f is efficiently transmitted through the left and right curved portions 433, 436 to the front linear portions 431, 434 as shown by arrow g.

The load dispersed into the support frame 116 as shown by the arrow e is transmitted to the center of the substantially linear support frame 416 as shown by arrow h, and is further transmitted to the front linear portions 431, 434 of the left and right rear frame members 412, 413 as shown by arrow i.

The front end portions of the left and right rear frame members 412, 413 (that is, the front linear portions 431, 434) are substantially collinear with the vehicle frame 11. Thus, the load transmitted to the front linear portions 431, 434 of the left and right rear frame members 412, 413 is efficiently transmitted to the vehicle frame 11, and the vehicle frame 11 receives the load.

As described above, the left curved portion 433 is prevented from deformation by the left connecting member 328. Thus, the left rear area 342b enclosed by the left connecting member 328, the curved portion including the highest portion 433a (that is, the rear curved portion) 133d and the support frame 116 can be sufficiently maintained. The tank valve 22 of the gaseous fuel tank 18 is disposed in the maintained left rear area 342b. Even when the load F is applied to the rear portions 412a, 413a of the left and right rear frame members 412, 413, the left rear area 342 is maintained, and the left rear frame member 412 is prevented from interfering with the tank valve 22.

Although the third embodiment has been described with the example in which the left connecting member 328 is connected to the forward portion 25d in front of the highest portion 25c of the left curved portion 25, and the right connecting member 29 is connected to the forward portion 35d in front of the highest portion 35c of the right curved portion 35, the connecting positions of the left and right connecting members 28, 29 are not limited thereto. The point is that the left connecting member 28 is connected in the vicinity of the highest portion 25c of the left curved portion 25, and the right connecting member 29 is connected in the vicinity of the highest portion 35c of the right curved portion 35.

Likewise, in the fourth embodiment, the left connecting member 328 is connected to the forward portion 433b in front of the highest portion 433a of the left curved portion 433, and the right connecting member 329 is connected to the forward portion 436b in front of the highest portion 436a of the right curved portion 436, but the connecting positions of the left and right connecting members 328, 329 are not limited thereto. The point is that the left connecting member 328 is connected in the vicinity of the highest portion 433a of the left curved portion 433, and the right connecting member 329 is connected in the vicinity of the highest portion 436a of the right curved portion 436.

Now, an configuration of a rear structure 510 of a gaseous fuel vehicle according to a fifth embodiment will be described with reference to FIGS. 15 to 18. In the description of the fifth embodiment, the same components as those in the rear structure 10 of the gaseous fuel vehicle in the first embodiment are given the same reference numerals to avoid redundant description.

The rear structure 510 of the gaseous fuel vehicle in the fifth embodiment shown in FIGS. 15 to 18 is different from that in the first embodiment in that a front support member (support member) 528 of a height almost reaching the height of the center of a gaseous fuel tank 18 (the center height of the gaseous fuel tank) G1 (see FIG. 17) is provided in the center of the support frame 16 and in front of the gaseous fuel tank 18.

Front mounting brackets 583, 583 of a pair of holding band units (holding bands) 71, 71 are fixed to the front support member 528. Rear mounting brackets 584, 584 of the pair of holding band units 71, 71 (see FIGS. 17 and 18) are fixed to a rear crossmember 92 of the support frame 16.

The support frame 16 has a configuration in which the front ends of left and right side members 41, 43 are connected by a front crossmember 91, middle portions of the left and right side members 41, 43 are connected by a center crossmember 93, and the rear ends of the left and right side members 41, 43 are connected by the rear crossmember 92.

The gaseous fuel tank 18 is attached to the support frame 16 via the pair of holding band units 71, 71. The support frame 16 is mounted to left and right rear frame members 12, 13 from below by bolts 19.

The support frame 16 is a member smaller than the left and right rear frame members 12, 13. A work space for mounting the gaseous fuel tank 18 is sufficiently secured around the support frame 16. Thus, the mounting operation is facilitated, and the workload can be reduced.

The front support member 528 includes left and right legs 529, 531 provided upright on the left and right side members 41, 43, and a support beam 532 connected to upper ends 529a, 531a of the left and right legs 529, 531. A left inclined portion 532a is formed in the left end of the support beam 532, and a right inclined portion 532b is formed in the right end of the support beam 532.

Figure 18:
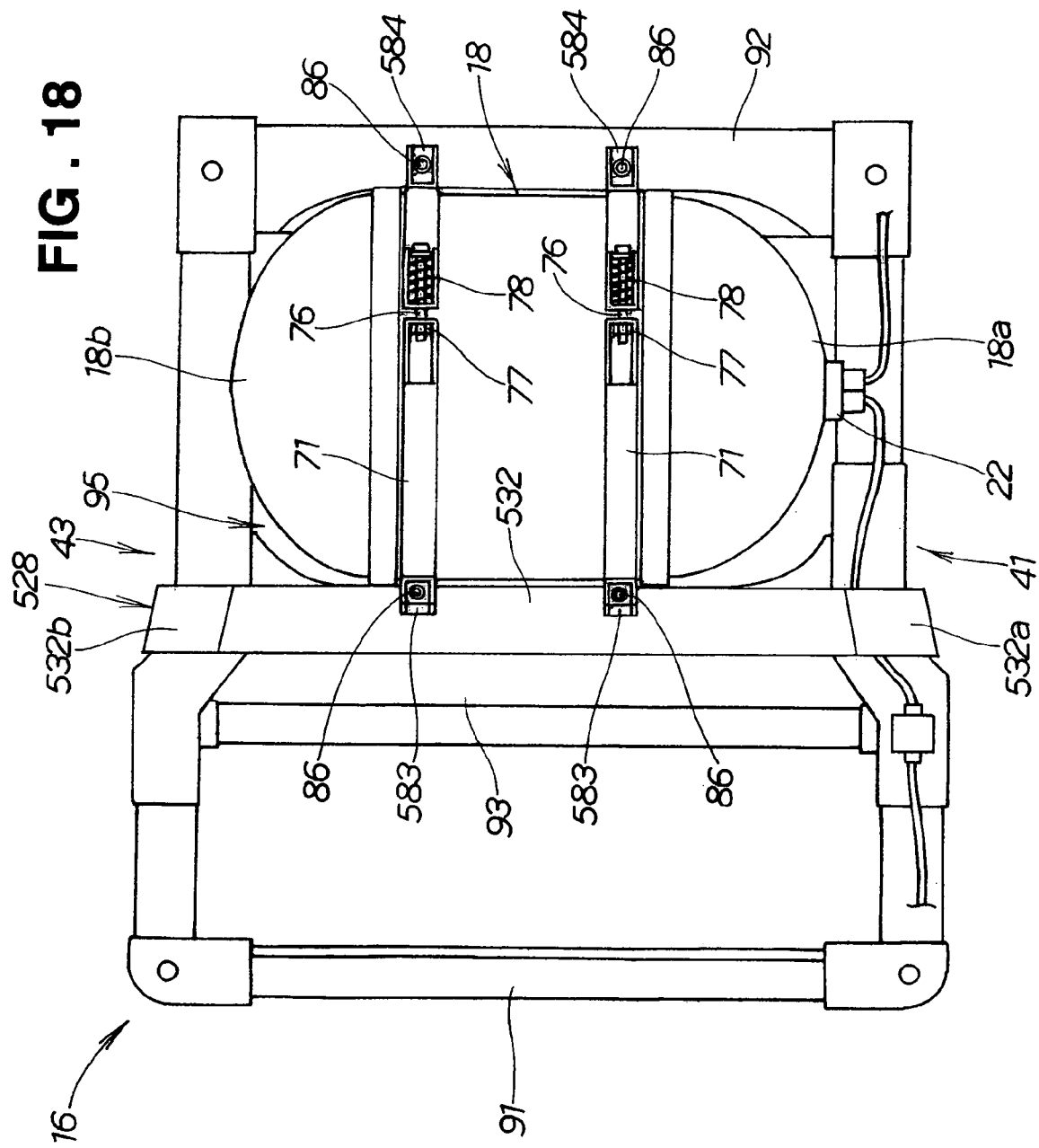
FIG. 18 is a view taken in the direction of arrow 18 in FIG. 17.

The front mounting brackets 583, 583 of the pair of holding band units 71, 71 are fixed to the support beam 532 of the front support member 528 by bolts 86, 86 (see also FIG. 18).

The four corners of the support frame 16 are attached from below to the left and right rear frame members 12, 13 by the bolts 19. At that time, a lower surface of the left rear frame member 12 abuts the left inclined portion 532a, and a lower surface of the right rear frame member 13 abuts the right inclined portion 32b (see FIG. 16). In this invention, an alternative configuration is possible in which the left and right rear frame members 12, 13 are not attached to the left and right ends of the support beam 532.

The gaseous fuel tank 18 has a cylindrical shape as in the first to fourth embodiments. The gaseous fuel tank 18 has a tank valve 22 at the center G1 of the height of a left end 18a (see FIGS. 16 and 17), for example.

A gas supply line 23 and a gas introduction line 24 are attached to the tank valve 22 of the gaseous fuel tank 18. The gas supply line 23 is a pipe for supplying gas to the gaseous fuel tank 18. The gas introduction line 24 is a pipe for introducing gas in the gaseous fuel tank 18 to a desired component.

Figure 15:
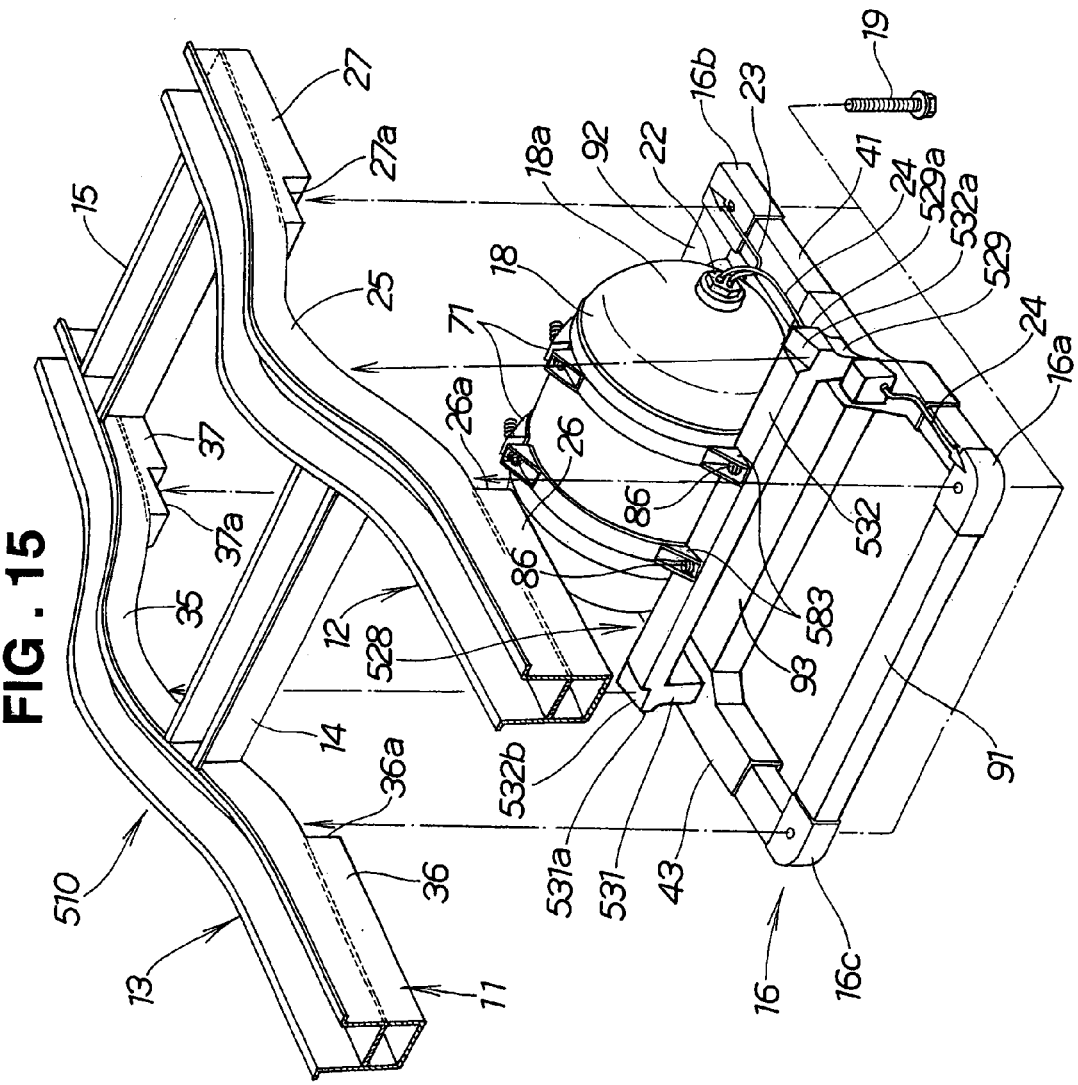
FIG. 15 is an exploded perspective view of a rear structure of a gaseous fuel vehicle according to a fifth embodiment of the present invention.
Figure 16:
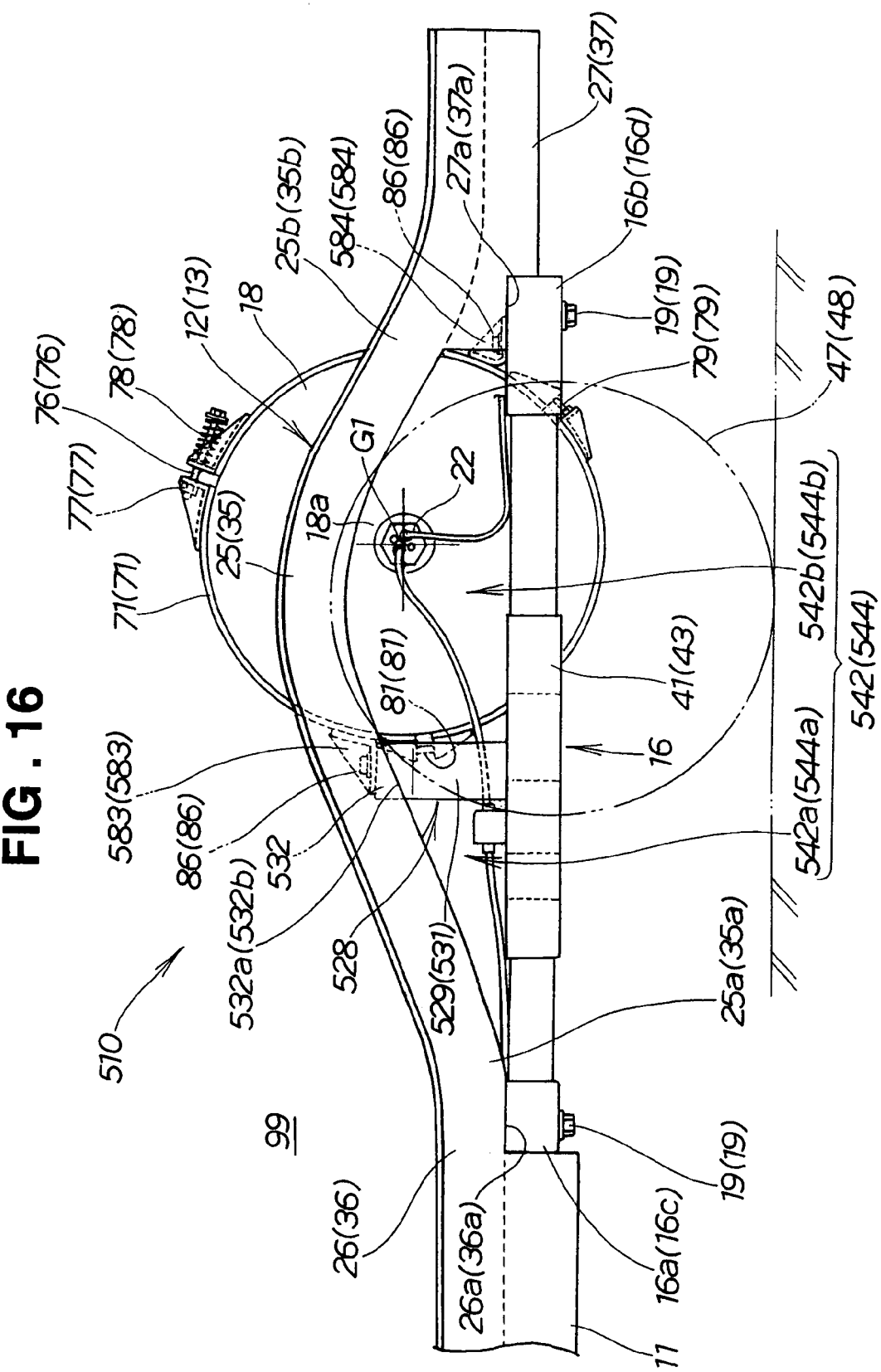
FIG. 16 is a side view of the rear structure of the gaseous fuel vehicle shown in FIG. 15.

As shown in FIG. 16, a left area 542 enclosed by a left curved portion 25 of the left rear frame member 12 and the left side member 41 of the support frame 16 is formed, and a right area 544 enclosed by a right curved portion 35 of the right rear frame member 13 and the right side member 43 of the support frame 16 (see also FIG. 15) is formed.

Left and right ends 18a, 18b of the gaseous fuel tank 18 (see FIG. 18 for the right end 18b) are arranged in the left area 542 and the right area 544, respectively.

The front support member 528 is mounted to the left rear frame member 12, so that the left area 542 is divided into a left front area 542a and a left rear area 542b. The tank valve 22 attached to the gaseous fuel tank 18 is disposed in the left rear area 542b. Thus, the left rear frame member 12, the support frame 16 and the left leg 529 protect the tank valve 22 of the gaseous fuel tank 18.

Likewise, the front support member 528 is mounted to the right rear frame member 13, so that the right area 544 is divided into a right front area 544a and a right rear area 544b.

A front linear portion 26 is lowered to the height of a vehicle frame 11 in front of the left rear frame member 12, and a rear linear portion 27 is also lowered.

Likewise, the front linear portion 36 is lowered to the height of the vehicle frame 11 in front of the right rear frame member 13, and the rear linear portion 37 is also lowered.

Accordingly, a floor surface (not shown) located on the front linear portions 26, 36 and the rear linear portions 27, 37 is lowered to provide a lower floor in a passenger compartment 99.

Figure 17:
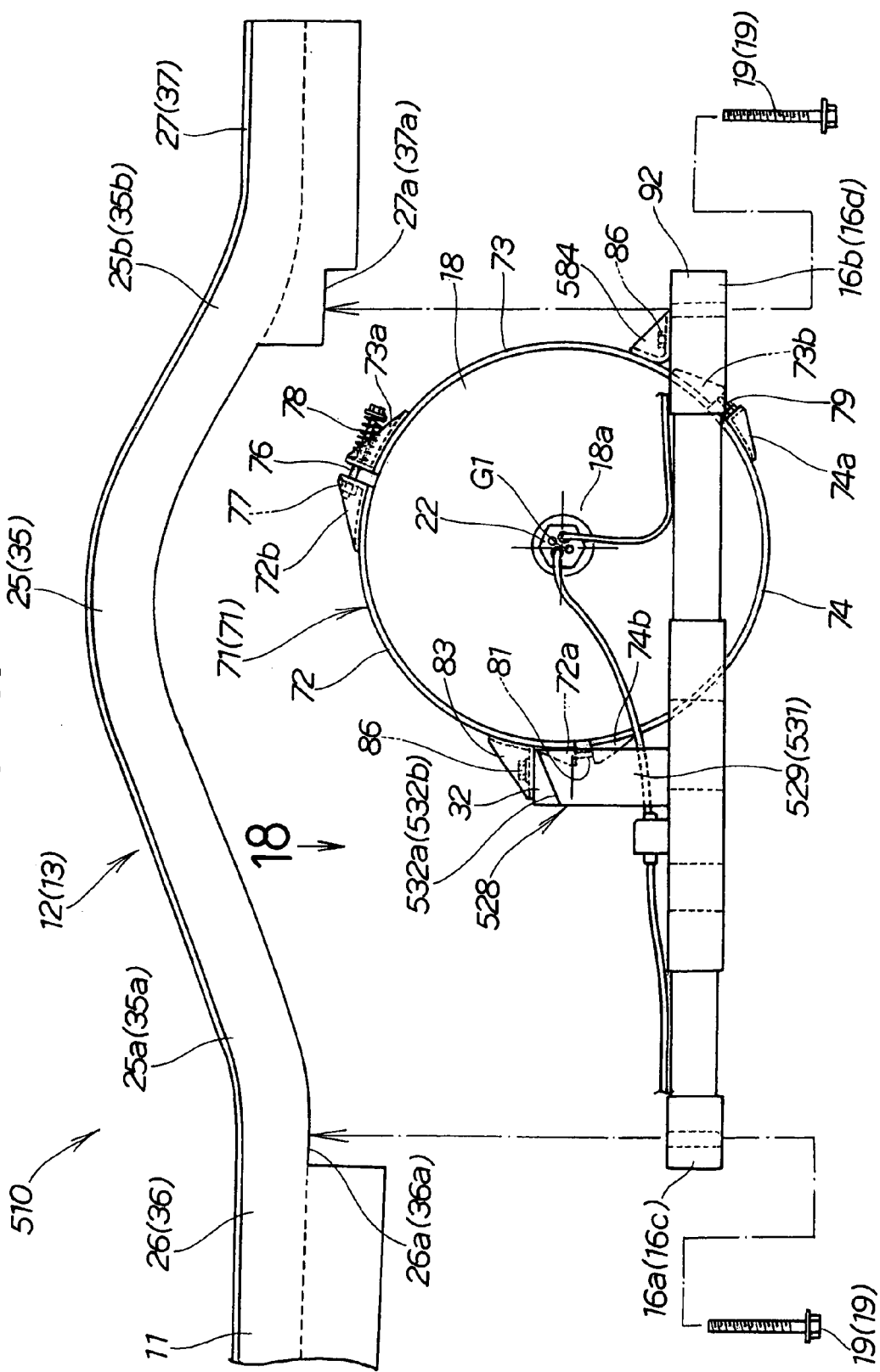
FIG. 17 is an exploded side view of the rear structure of the gaseous fuel vehicle shown in FIG. 16.

As shown in FIG. 17, the pair of holding band units 71, 71 are fastened around the gaseous fuel tank 18 with a predetermined space therebetween as shown in FIG. 15. The configuration of the holding band units 71 is the same as in the first embodiment shown in FIG. 3.

The front mounting brackets 583 are attached to upper surfaces of the support beam 532 of the front support member 528 by the bolts 86 to be located slightly higher than the center height G1 of the gaseous fuel tank 18. The rear mounting brackets 584 are attached to the rear crossmember 92 of the support frame 16 by the bolts 86 to be located lower than the center height G1 of the gaseous fuel tank 18. In this manner, the gaseous fuel tank 18 is mounted to the support frame 16 and the front support member 528.

The gaseous fuel tank 18 is a large-diameter tank, so that the tank valve 22 of the gaseous fuel tank 18 is located at a height above the support frame 16.

The front support member 528 is provided with a height almost reaching the center height G1 of the gaseous fuel tank 18. When the front mounting brackets 583 are fixed to the support beam 532 of the front support member 528 by the bolts 86, the center G1 of the height of the gaseous fuel tank 18, or the center of gravity is supported by the front support member 528.

As shown in FIG. 18, the left and right legs 529, 531 (see FIG. 15) of the front support member 528 are attached to middle portions of the left and right side members 41, 43 of the support frame 16, respectively. With this, the support beam 532 of the front support member 528 is arranged in front of the gaseous fuel tank 18 and in parallel with the longitudinal direction of the gaseous fuel tank 18.

To dispose the gaseous fuel tank 18 in a holding area 95, the front mounting brackets 583, 583 of the pair of holding band units 71, 71 are attached to the support beam 532 by the bolts 86, 86, and the rear mounting brackets 584, 584 of the holding band units 71, 71 are attached to the rear crossmember 92 by the bolts 86, 86. At that time, the left and right ends 18a, 18b of the gaseous fuel tank 18 are arranged opposite to the left and right side members 41, 43.

Figure 25:
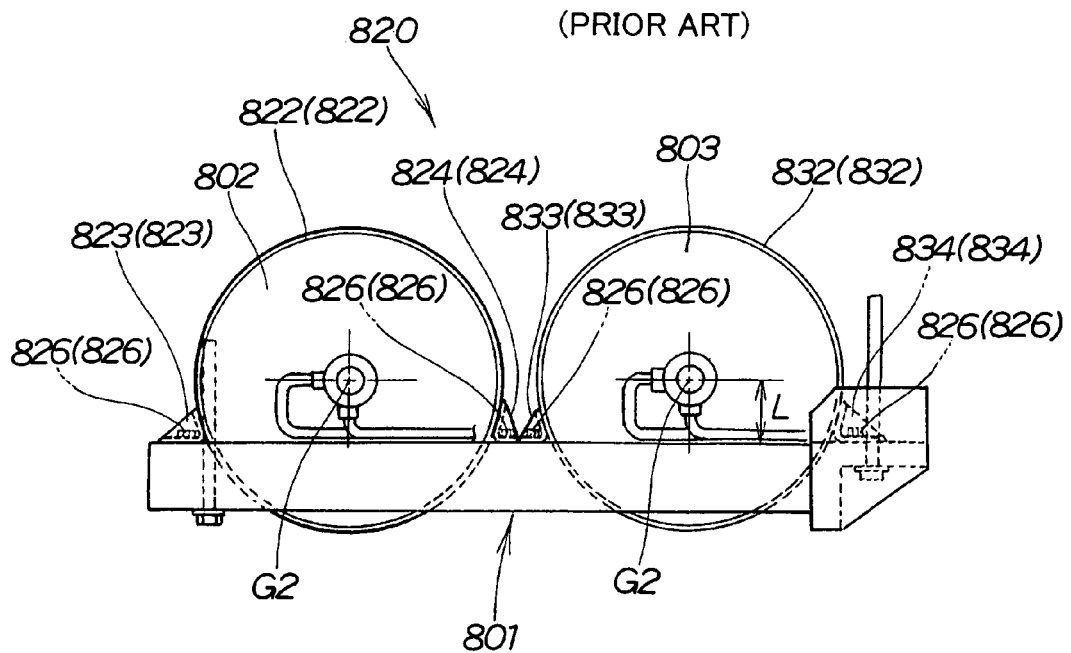
FIG. 25 is a diagram illustrating a support structure of gaseous fuel tanks shown in FIG. 24.

Now, an operation of the rear structure 510 of the gaseous fuel vehicle according to the fifth embodiment will be described with reference to FIGS. 19A and 19B, in comparison with the related art shown in FIG. 25.

Figure 19:
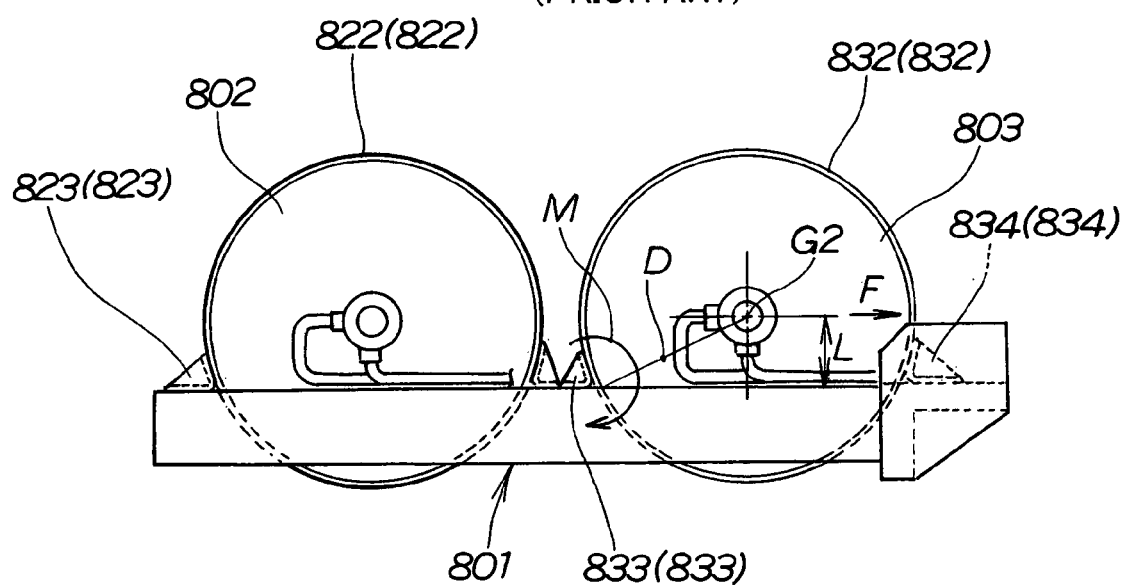
FIG. 19A and 19B are diagrams comparatively illustrating an operation of a rear structure of a gaseous fuel vehicle in a related art and that in the fifth embodiment.
Figure 19:
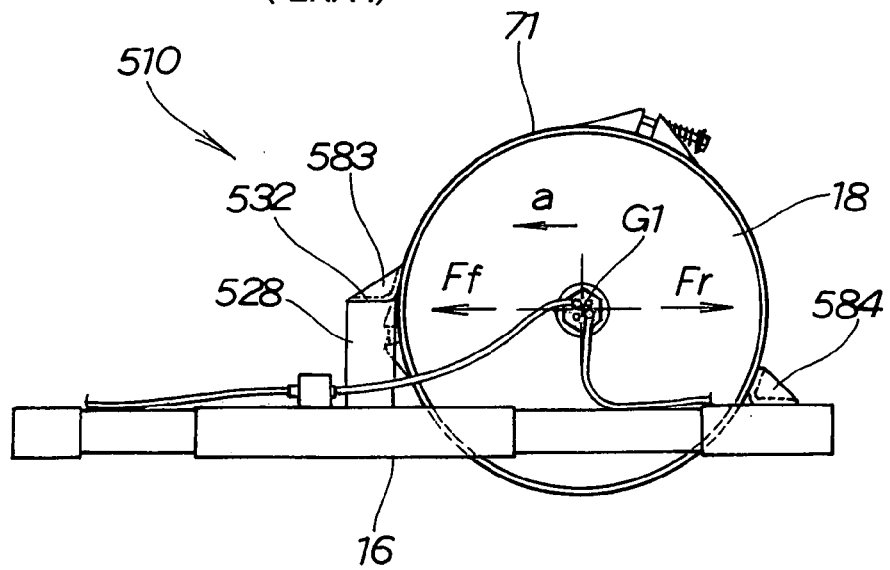

In a related art shown in FIG. 19A, the center of the height (or the center of gravity) G2 of a rear gaseous fuel tank 803 is located above a support frame 801. The rear gaseous fuel tank 803 is attached to the support frame 801 by front and rear mounting brackets 833, 834. Thus, the attached position of the rear gaseous fuel tank 803 is lower than the center height G2 of the rear gaseous fuel tank 803 by distance L.

According to the related art, when a vehicle is running on a bad road, the rear gaseous fuel tank 803 tries to move in longitudinal directions, so that longitudinal forces are applied to the center of gravity, or the center of the height G2 of the rear gaseous fuel tank 803.

Assume that a force of arrow F is applied to the center of the height G2 of the rear gaseous fuel tank 803.

When the force of arrow F acts on the height center G2 of the rear gaseous fuel tank 803, a moment M=F×L occurs at the front and rear mounting brackets 833, 834 and nearby rear holding bands 832, 832.

To withstand the moment M, the front and rear mounting brackets 833, 834 and the rear holding bands 832 need to have increased strength.

In the fifth embodiment shown in FIG. 19B, the front mounting brackets 583 of the holding band units 71 are attached to the front support member 528 of a height almost reaching the center height G1 of the gaseous fuel tank 18, in the center of the support frame 16 and in front of the gaseous fuel tank 18. The rear mounting brackets 584 of the holding band units 71 are also attached to the support frame 16.

The height of the front support member 528 is set substantially equal to the height of the center G1 of the gaseous fuel tank 18. Thus, the center G1, or the center of gravity of the gaseous fuel tank 18 is supported by the front support member 528.

Therefore, when longitudinal forces Ff, Fr alternately act on the center G1 of the gaseous fuel tank 18 as shown by arrows, for example, during bad road travel, no substantial moments occur at the front and rear mounting brackets 583, 584 and the holding band units 71. Thus, the strength of the front and rear mounting brackets 583, 584 and the holding band units 71 can be reduced. In addition, with the reduction in strength of those components, the plate thickness of the holding band units 71 can be reduced.

When the gaseous fuel tank 18 tries to move toward the front support member 528 as shown by arrow a, the front support member 528 prevents the movement of the gaseous fuel tank 18 without resort to the front and rear mounting brackets 583, 584 and the holding band units 71. Thus, the strength of the front and rear mounting brackets 583, 584 and the holding band units 71 can be further reduced.

For the above-described reasons, the rear structure 510 of the gaseous fuel vehicle in the fifth embodiment allows for reduction in strength of the front and rear mounting brackets 583, 584 and the holding band units 71.

Now, the configuration of a rear structure 610 of a gaseous fuel vehicle in a sixth embodiment of the present invention will be described with reference to FIGS. 20 and 21. In the description of the sixth embodiment, the same components as in the rear structure 510 of the gaseous fuel vehicle in the fifth embodiment are given the same reference numerals to avoid redundant description.

Figure 20:
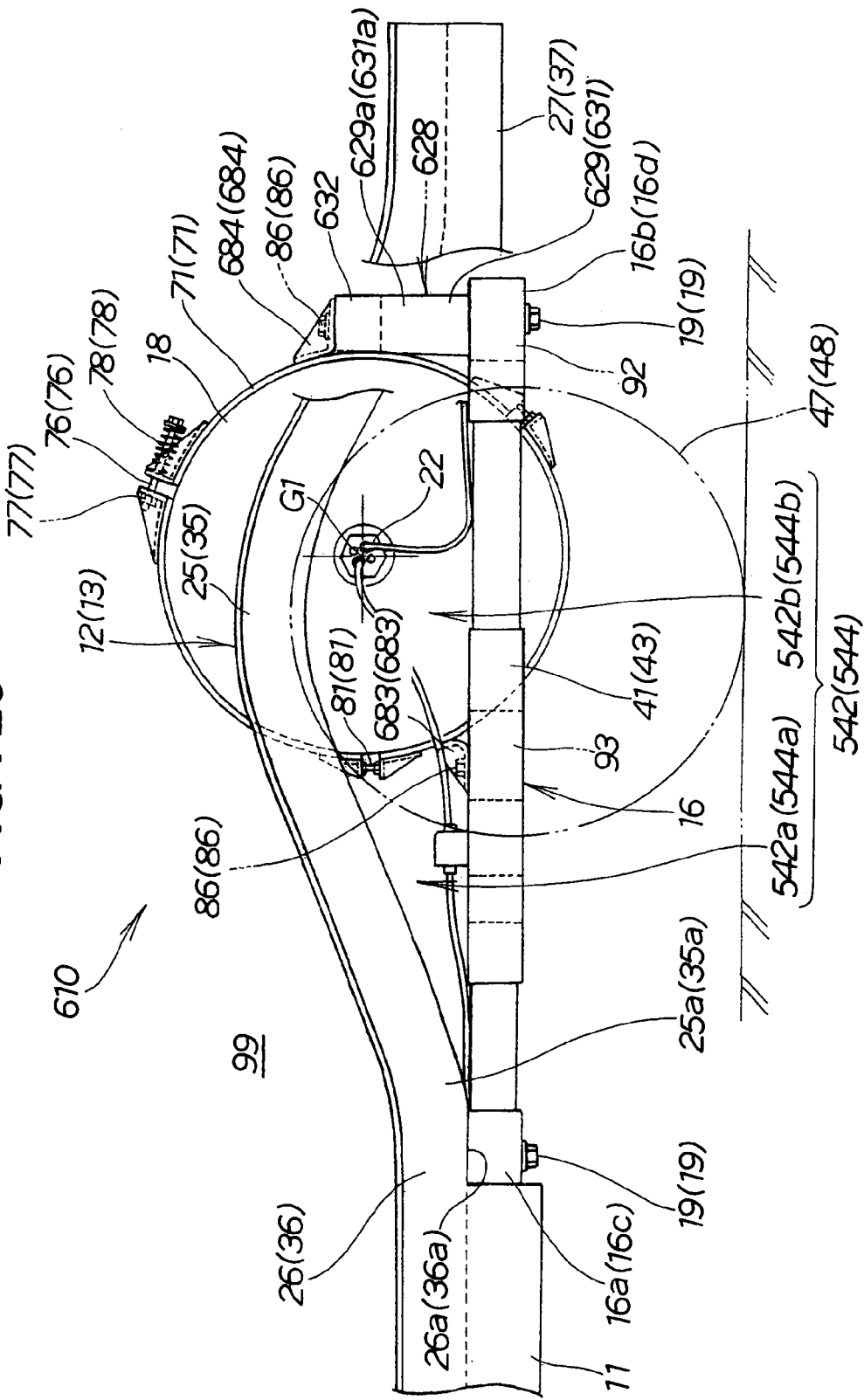
FIG. 20 is a side view of a rear structure of a gaseous fuel vehicle according to a sixth embodiment of the present invention.

The rear structure 610 of the gaseous fuel vehicle in the sixth embodiment shown in FIG. 20 is different from the rear structure 510 of the gaseous fuel vehicle in the fifth embodiment in that a rear support member 628 of a height almost reaching the center height G1 of a gaseous fuel tank 18 is provided at the rear end of the support frame 16 and behind the gaseous fuel tank 18.

Rear mounting brackets 684, 684 of a pair of holding band units 71, 71 are fixed on upper surfaces of the rear support member 628. Front mounting brackets 683, 683 of the pair of holding band units 71, 71 are fixed on upper surfaces of a center crossmember 93 (see FIG. 15) of the support frame 16.

The rear support member 628 is a member formed in the same manner as the front support member 528 shown in FIG. 15. Specifically, the rear support member 628 includes left and right legs 629, 631 provided upright on a rear crossmember 92 of the support frame 16 (see also FIG. 15), and a support beam 632 connected to upper ends 629a, 631a of the left and right legs 629, 631. The rear mounting brackets 684, 684 are fixed to the support beam 632 by bolts 86, 86.

Now, an operation of the rear structure 610 of the gaseous fuel vehicle in the sixth embodiment will be described with reference to FIG. 21.

Figure 21:
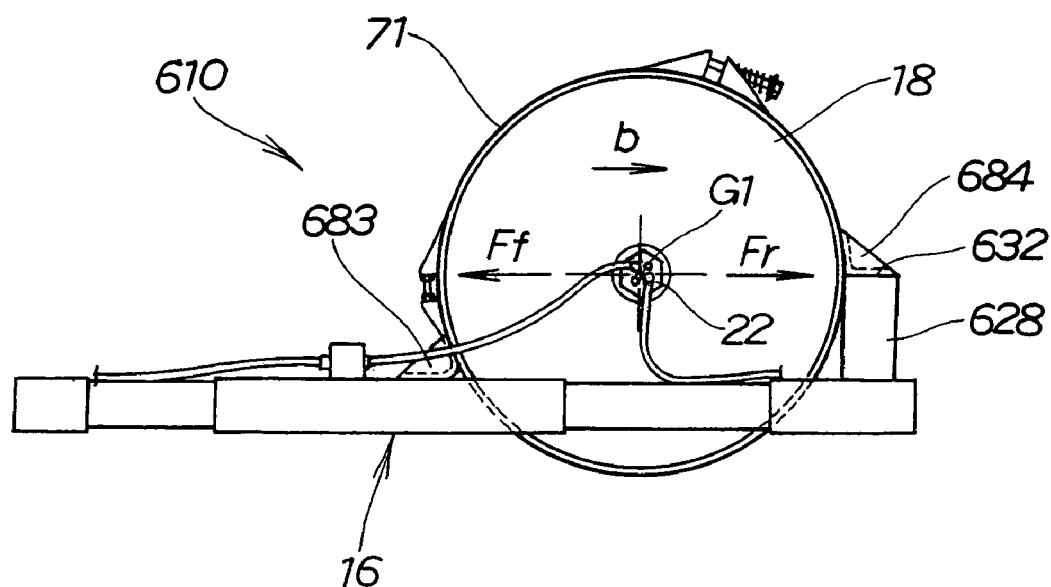
FIG. 21 is a diagram illustrating forces acting on the center of the height of the gaseous fuel tank shown in FIG. 20.

As shown in FIG. 21, the height of the rear support member 628 is set substantially equal to the center height G1 of the gaseous fuel tank 18. Consequently, the center G1, or the center of gravity of the gaseous fuel tank 18 is supported by the rear support member 628.

When a vehicle is running on a bad road, and longitudinal forces Ff, Fr act on the center G1 of the gaseous fuel tank 18 as shown by arrows, for example, no substantial moments occur at the front and rear mounting brackets 683, 684 and the holding band units 71. Therefore, the strength of the front and rear mounting brackets 683, 684 and the holding band units 71 can be reduced. In addition, with the reduction in strength of those components, the thickness of the holding band units 71 can be reduced.

When the gaseous fuel tank 18 tries to move toward the rear support member 628 as shown by arrow b, the rear support member 628 can prevent the movement of the gaseous fuel tank 18 without resort to the front and rear mounting brackets 683, 684 and the holding band units 71. Thus, the strength of the front and rear mounting brackets 683, 684 and the holding band units 71 can be further reduced.

Figure 23:
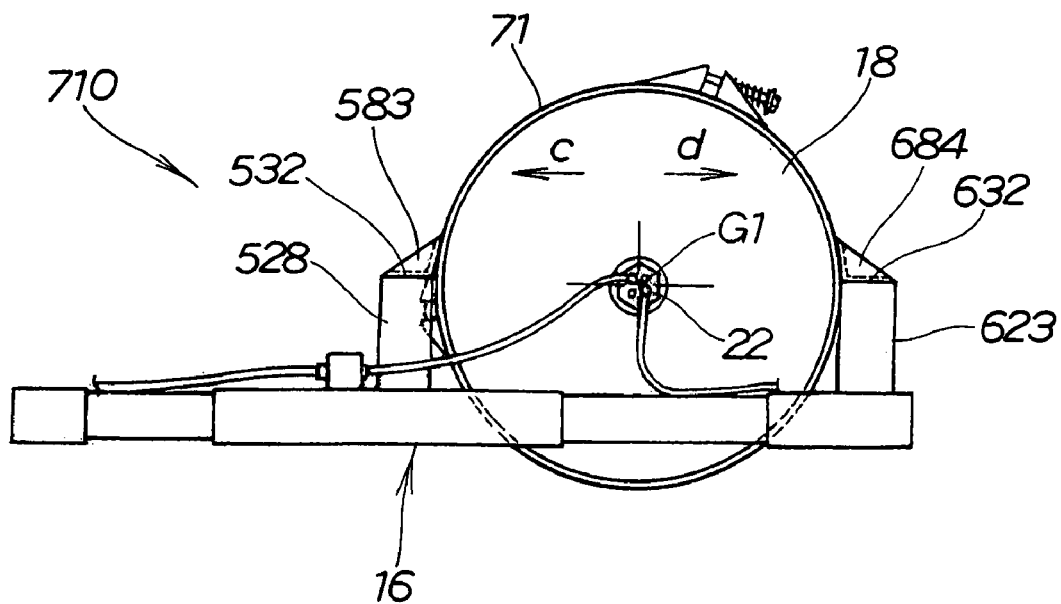
FIG. 23 is an explanatory view of forces acting on the center of the height of the gaseous fuel tank shown in FIG. 22.
Figure 22:
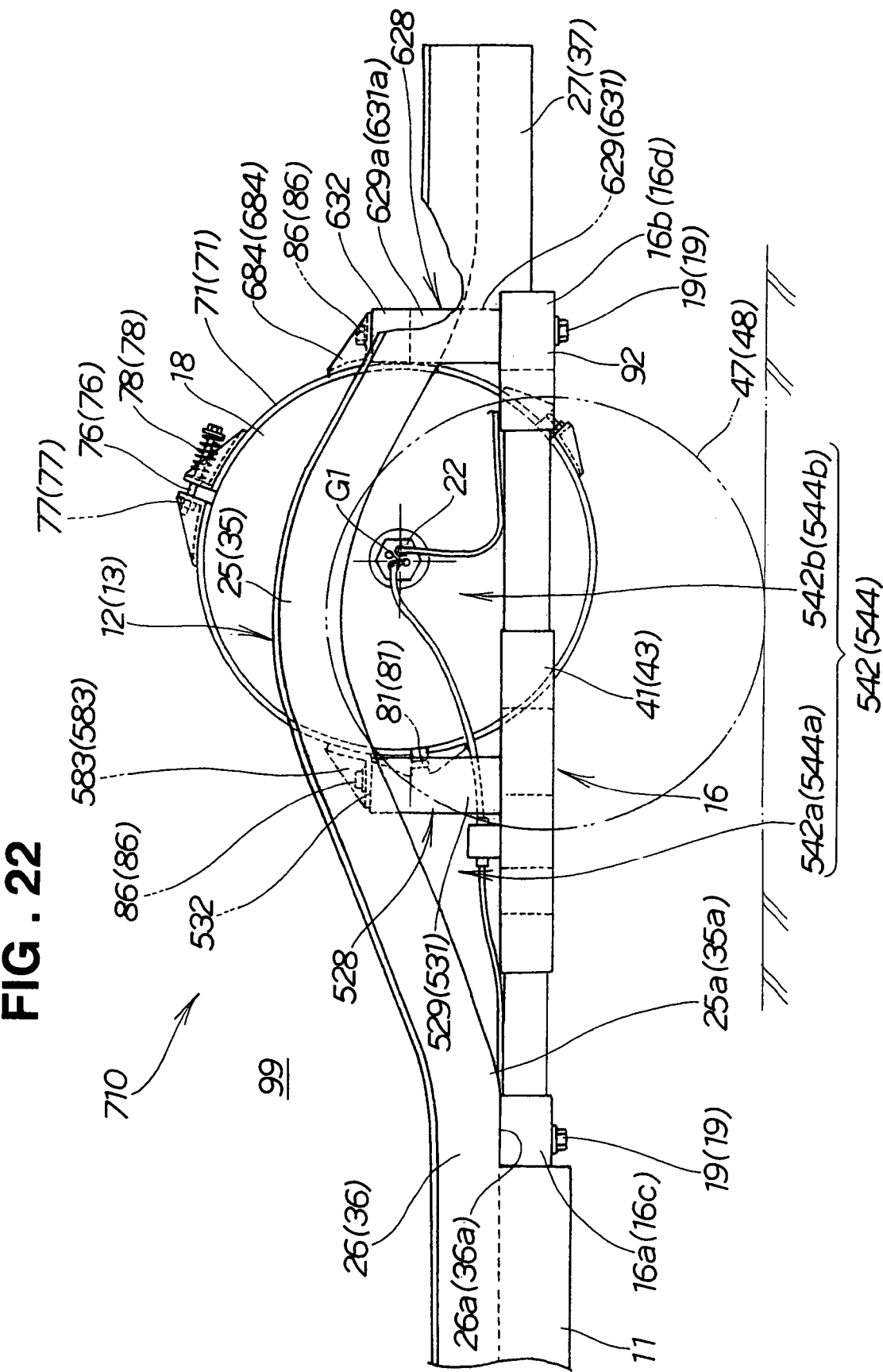
FIG. 22 is a side view of a rear structure of a gaseous fuel vehicle according to a seventh embodiment of the present invention.
Figure 24:
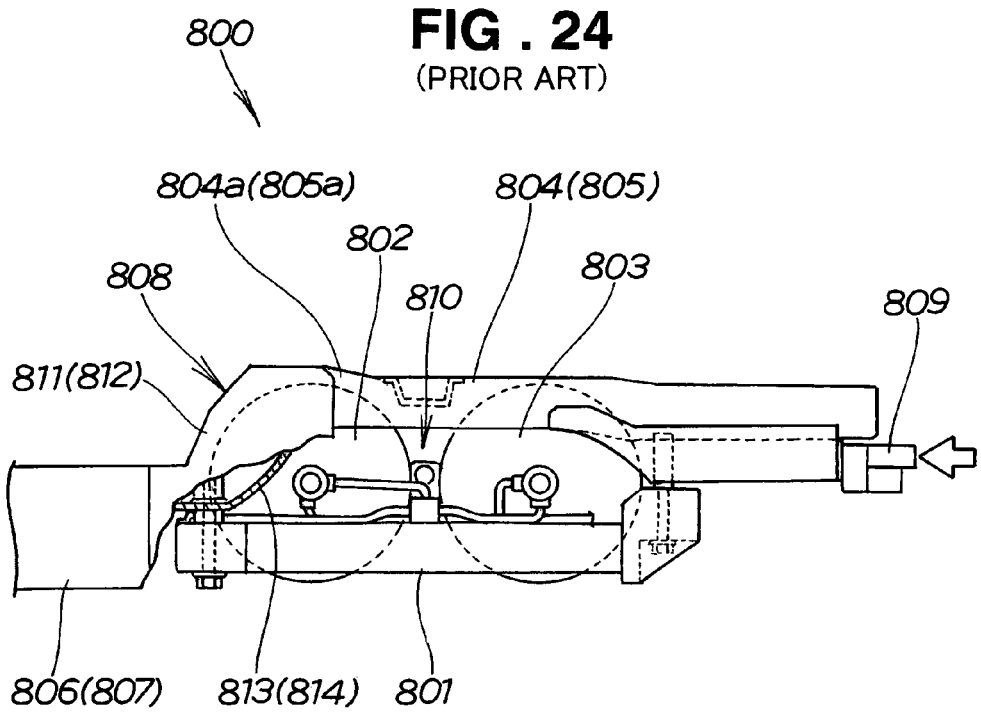
FIG. 24 is a diagram illustrating a conventional rear structure of a gaseous fuel vehicle.

Now, the configuration and operation of a rear structure 710 of a gaseous fuel vehicle in a seventh embodiment of the present invention will be described with reference to FIGS. 22 and 23. In the description of the seventh embodiment, the same components as in the rear structure 510 of the gaseous fuel vehicle in the fifth embodiment and the rear structure 610 of the gaseous fuel vehicle in the sixth embodiment are given the same reference numerals, to avoid redundant description.

The rear structure 710 of the gaseous fuel vehicle in the seventh embodiment includes a front support member 528 provided at the center of a support frame 16 and in front of a gaseous fuel tank 18, and a rear support member 628 provided at the rear end of the support frame 16 and behind the gaseous fuel tank 18.

The front support member 528 and the rear support member 628 have a height almost reaching the center height G1 of the gaseous fuel tank 18 (see FIGS. 17 and 20).

Front mounting brackets 583, 583 of a pair of holding band units 71, 71 are fixed on upper surfaces of the front support member 528 by bolts 86, 86, and rear mounting brackets 684, 684 are fixed on upper surfaces of the rear support member 628 by bolts 86, 86.

Now, an operation of the rear structure 710 of the gaseous fuel vehicle in the seventh embodiment will be described with reference to FIG. 23.

The height of the front support member 528 and the rear support member 628 is set substantially equal to the height of the center G1 of the gaseous fuel tank 18. With this, the center G1, or the center of gravity of the gaseous fuel tank 18 is supported by the front support member 528 and the rear support member 628. When longitudinal forces Ff, Fr act on the center G1 of the gaseous fuel tank 18 as shown by arrows, for example, during bad road travel, no substantial moments occur at the front and rear mounting brackets 583, 684 and the holding band units 71. Therefore, the strength of the front and rear mounting brackets 583, 684 and the holding band units 71 can be reduced. In addition, with the reduction in strength of those components, the thickness of the holding band units 71 can be reduced.

When the gaseous fuel tank 18 tries to move toward the front support member 528 as shown by arrow c, the front support member 528 can prevent the movement of the gaseous fuel tank 18 without resort to the front and rear mounting brackets 583, 684 and the holding band units 71.

Likewise, when the gaseous fuel tank 18 tries to move toward the rear support member 628 as shown by arrow d, the rear support member 628 can prevent the movement of the gaseous fuel tank 18 without resort to the front and rear mounting brackets 583, 684 and the holding band units 71.

Therefore, the strength of the front and rear mounting brackets 583, 684 and the holding band units 71 can be further reduced.

The fifth to seventh embodiments have been described with the example in which the three-part holding band units 71 are used as holding bands, which is not limiting. Instead, two-part holding bands or undivided holding bands may be used.

The fifth to seventh embodiments have been described with the example in which the front support member 528 is provided substantially at the center of the support frame 16, and the gaseous fuel tank 18 disposed behind the front support member 528 is supported by the front support member 528. In addition to the gaseous fuel tank 18, it is also possible to dispose another gaseous fuel tank 18 in front of the front support member 528, and support the front and rear two gaseous fuel tanks 18, 18 by the front support member 528.

Specifically, like the gaseous fuel tank 18 shown in FIGS. 15 and 18, a pair of holding band units are fastened around the gaseous fuel tank 18 located in front, and rear mounting brackets of the holding band units are attached to the front support member 528, and front mounting brackets of the holding band units are attached to a front crossmember 91 of the support frame 16 (see FIGS. 15 and 18). Consequently, the gaseous fuel tanks 18 can be mounted to the front half and the rear half of the support frame 16, respectively.

Even when the gaseous fuel tank 18 is mounted to the front half of the support frame 16 as described above, the strength of the front and rear mounting brackets and the holding band units can be reduced, and the thickness of the holding band units can be reduced, as in the fifth embodiment.

The front and rear two gaseous fuel tanks 18, 18 mounted on the support frame 16 can share the front support member 528 as described above, advantageously enabling effective use of space.

Obviously, various minor changes and modifications of the present invention are possible in the light of the above teaching. It is therefore to be understood that within the scope of the appended claims the invention may be practiced otherwise than as specifically described.

What is claimed is:

1. A rear structure of a gaseous fuel vehicle, comprising:
right and left rear frame members extending longitudinally of the vehicle; and
a rectangular support frame mounted to an underside of the right and left rear frame members, the support frame being configured to allow at least one substantially cylindrical gaseous fuel tank to be mounted thereon in a transversely extending position,
wherein each of the right and left rear frame members includes an upwardly-bulged curved portion, a front linear portion extending forwardly from a front end of the curved portion, and a rear linear portion extending rearwardly from a rear end of the curved portion, and the support frame is attached to the front and rear linear portions,
wherein each of the right and left rear frame members includes a front depressed portion formed in a lower portion of the front linear portion, and a rear depressed portion formed in a lower portion of the rear linear portion, the support frame being fitted into the front depressed portion and the rear depressed portion.

2. A rear structure of a gaseous fuel vehicle, comprising:
right and left rear frame members extending longitudinally of the vehicle;
a rectangular support frame mounted to an underside of the right and left rear frame members, the support frame being configured to allow at least one substantially cylindrical gaseous fuel tank to be mounted thereon in a transversely extending position,
wherein each of the right and left rear frame members includes an upwardly-bulged curved portion, a front linear portion extending forwardly from a front end of the curved portion, and a rear linear portion extending rearwardly from a rear end of the curved portion, and the support frame is attached to the front and rear linear portions; and
a connecting member rising from the support frame and connected to a portion near a highest portion of the curved portion.

3. A rear structure as set forth in claim 1, wherein the gaseous fuel tank is capable of being fixed to the support frame by a holding band.

4. A rear structure as set forth in claim 3, further comprising a support member rising from the support frame and having a height almost reaching a center height of the gaseous fuel tank, the holding band being fixed at a front portion and/or a rear portion thereof to the support member.

5. A rear structure of a gaseous fuel vehicle, comprising:
right and left rear frame members extending longitudinally of the vehicle;
a rectangular support frame mounted to an underside of the right and left rear frame members, the support frame being configured to allow at least one substantially cylindrical gaseous fuel tank to be mounted thereon in a transversely extending position, wherein each of the right and left rear frame members includes an upwardly-bulged curved portion, a front linear portion extending forwardly from a front end of the curved portion, and a rear linear portion extending rearwardly from a rear end of the curved portion, and the support frame is attached to the front and rear linear portions, wherein the gaseous fuel tank is capable of being fixed to the support frame by a holding band; and a support member rising from the support frame and having a height almost reaching a center height of the gaseous fuel tank, the holding band being fixed at a front portion and/or a rear portion thereof to the support member, wherein two gaseous fuel tanks are provided in parallel one behind the other, and the support member is provided between the front and rear gaseous fuel tanks.

6. A rear structure as set forth in claim 1, wherein a tank valve attached to the gaseous fuel tank is disposed in an area enclosed by the curved portion and the support frame.

* * * * *